US011131061B2

(12) United States Patent
Konishi et al.

(10) Patent No.: US 11,131,061 B2
(45) Date of Patent: Sep. 28, 2021

(54) METHOD FOR MANUFACTURING RECYCLED PULP FIBERS

(71) Applicant: Unicharm Corporation, Ehime (JP)

(72) Inventors: Takayoshi Konishi, Kanonji (JP); Toshio Hiraoka, Kanonji (JP); Takashi Kato, Kanonji (JP); Noritomo Kurita, Kanonji (JP)

(73) Assignee: UNICHARM CORPORATION, Ehime (JP)

( * ) Notice: Subject to any disclaimer, the term of this patent is extended or adjusted under 35 U.S.C. 154(b) by 0 days.

(21) Appl. No.: 16/772,235

(22) PCT Filed: Dec. 20, 2017

(86) PCT No.: PCT/JP2017/045795
§ 371 (c)(1),
(2) Date: Jun. 12, 2020

(87) PCT Pub. No.: WO2019/123580
PCT Pub. Date: Jun. 27, 2019

(65) Prior Publication Data
US 2020/0378066 A1    Dec. 3, 2020

(51) Int. Cl.
*D21C 5/02* (2006.01)
*B09B 3/00* (2006.01)

(52) U.S. Cl.
CPC ............. *D21C 5/02* (2013.01); *B09B 3/0008* (2013.01); *B09B 3/0016* (2013.01); *B09B 3/0083* (2013.01)

(58) Field of Classification Search
CPC ........ D21C 3/045; D21C 3/028; D21C 3/026; D21C 5/02; D21C 9/1068; D21C 9/1073; B09B 3/0016; B09B 3/0008; B09B 3/0083
See application file for complete search history.

(56) References Cited

U.S. PATENT DOCUMENTS 3,755,068 A * 8/1973 Rapson ................ C01D 3/04
162/30.1
2010/0133197 A1 * 6/2010 Langner ................ D21C 5/02
210/703

(Continued)

FOREIGN PATENT DOCUMENTS

CA        2789776 A1    3/2013
EP         511433 A1   11/1992

(Continued)

OTHER PUBLICATIONS

English Translation of KR-20120064608-A retrieved Dec. 2, 2020 (Year: 2012).*

(Continued)

*Primary Examiner* — Eric Hug
*Assistant Examiner* — Elisa H Vera
(74) *Attorney, Agent, or Firm* — Fredriksen & Byron, P.A.

(57) ABSTRACT

The present invention provides a method which, in the process of manufacturing recycled pulp fibers from a mixture of pulp fibers and a high water-absorption polymer, enables efficient manufacturing of the recycled pulp fibers while properly removing the high water-absorption polymer from the pulp fibers. This method comprises: a supply step (S19-2a) for supplying an aqueous solution containing a mixture (98) to a driving fluid supply port (DI) of an ejector (107) and simultaneously supplying, to a suction fluid supply port (AI) of the ejector, a gaseous substance (Z2) which is capable of degrading a high water-absorption polymer so as to make the degraded polymer dissolvable; and a treatment step (S19-2b) for discharging, from a mixed fluid discharge port (CO) of the ejector that is connected to a lower part of a treatment tank (105), a mixed liquid, which is formed when the aqueous solution and the gaseous substance are mixed within the ejector, into a treatment (Continued)

liquid (P2) within the treatment tank, so as to lessen the high water-absorption polymer in the mixture.

8 Claims, 5 Drawing Sheets

(56) References Cited

U.S. PATENT DOCUMENTS

| | | | |
|---|---|---|---|
| 2015/0291762 A1* | 10/2015 | Watanabe | D21C 5/02 428/401 |
| 2015/0337486 A1* | 11/2015 | Lee | D21C 9/163 442/327 |
| 2019/0000698 A1 | 1/2019 | Konishi et al. | |

FOREIGN PATENT DOCUMENTS

| | | |
|---|---|---|
| JP | H09234479 A | 9/1997 |
| JP | H10109026 A | 4/1998 |
| JP | 2001170665 A | 6/2001 |
| JP | 2017113736 A | 6/2017 |
| KR | 20120064608 A * | 6/2012 |
| WO | 9300470 A1 | 1/1993 |
| WO | 9429513 A1 | 12/1994 |
| WO | 2017110234 A1 | 6/2017 |

OTHER PUBLICATIONS

PCT International Search Report dated Apr. 3, 2018 for Intl. App. No. PCT/JP2017/045795, from which the instant application is based, 1 pg.

English Abstract and Machine Translation for Japanese Publication No. 2001-170665 A, published Jun. 26, 2001, 25 pgs.

English Abstract and Machine Translation for Japanese Publication No. JPH10-109026 A, published Apr. 28, 1998, 17 pgs.

English Abstract and Machine Translation for Japanese Publication No. JPH09-234479 A, published Sep. 9, 1997, 18 pgs.

English Abstract for Japanese Publication No. JP2017113736A, published Jun. 29, 2017, 1 pg.

Extended European Search Report for European Application No. EP17935541.7, dated Oct. 13, 2020, 8 pgs.

* cited by examiner

METHOD FOR MANUFACTURING RECYCLED PULP FIBERS

RELATED APPLICATIONS

This application is a 35 U.S.C. 371 national phase filing from International Application No. PCT/JP2017/045795, filed Dec. 20, 2017, the contents of which are incorporated herein by reference.

FIELD

The present invention relates to a method of manufacturing recycled pulp fibers from mixed matter of pulp fibers and superabsorbent polymers.

BACKGROUND

Methods of recovering pulp fibers from absorbent articles such as used disposable diapers, etc., and manufacturing recycled pulp fibers are known. For example, Patent Literature 1 discloses a method of manufacturing recycled pulp from used sanitary goods. The method includes a decomposing step of decomposing the used sanitary goods into pulp fibers and other materials by applying a physical force to the used sanitary goods in an acidic aqueous solution, etc.; a separating step of separating the pulp fibers from mixed matter of the pulp fibers and the other materials; and a treating step of treating the separated pulp fibers with an ozone containing aqueous solution. According to Patent literature 1, the pulp fibers are treated with the ozone containing aqueous solution, whereby a considerable amount of the super absorbent polymers which remain in the separated pulp fibers can be oxidatively decomposed, lowered in molecular weight, solubilized, and can be removed from the pulp fibers. As the method of treating the pulp fibers with the ozone containing aqueous solution, a method of putting the ozone containing aqueous solution in a treatment tank, and further putting the separated pulp fibers in the ozone containing aqueous solution is mentioned. At the time of treatment, a water stream may be created by moderately stirring the ozone containing aqueous solution, or an ozone gas may be blown into an aqueous solution put in the container, and a water stream may be generated in the ozone containing aqueous solution by rising bubbles of ozone gas.

CITATION LIST

Patent Literature

[PTL 1] Japanese Unexamined Patent Publication No. 2016-881

SUMMARY

Technical Problem

In order to make the pulp fibers which are recovered from used absorbent article more useful, it is important to reduce the concentration of the superabsorbent polymers which are impurities of the pulp fibers, and to improve the treatment efficiency of the pulp fibers so as to reduce the concentration of the superabsorbent polymers. In the method of Patent literature 1, in order to reduce the concentration of the superabsorbent polymers in the pulp fibers in a greater degree as possible, it is preferable to make it easier for the ozone in the ozone containing aqueous solution to be in contact with the pulp fibers by methods such as stirring the ozone containing aqueous solution, etc. On the other hand, in order to improve the treatment efficiency of the pulp fibers in a greater degree as possible, it is preferable to increase the pulp fibers to be thrown into the ozone containing aqueous solution so that the pulp fibers to be treated are increased as much as possible. However, when the pulp fibers to be thrown into the ozone containing aqueous solution are increased, there is a risk that it is difficult for the individual pulp fibers to come into contact with ozone. When that happens, it is difficult for the superabsorbent polymers to come into contact with ozone, whereby the removal of the superabsorbent polymers is to be insufficient, that is, unevenness in the treatment of pulp fibers occurs. Further, as a result, the purity of the regenerated pulp fibers, that is, the recycled pulp fibers is reduced, whereby it is difficult for the recycled pulp fibers to be reused, since the usage of reuse is to be limited, etc. However, when the removal of the superabsorbent polymers is sufficiently performed by increasing the amount of ozone in the ozone containing aqueous solution, or increasing the treatment time, the treatment efficiency of the pulp fibers is reduced, whereby it is difficult to efficiently manufacture the recycled pulp fibers.

The object of the present invention is to provide a method of manufacturing recycled pulp fibers by removing superabsorbent polymers from pulp fibers which include superabsorbent polymers, which can manufacture the recycled pulp fibers efficiently while suitably removing the superabsorbent polymers from the pulp fibers.

Solution to Problem

The method of manufacturing recycled pulp fibers according to the present invention is as follows. (1) A method of manufacturing recycled pulp fibers from mixed matter of pulp fibers and superabsorbent polymers which is separated from a used absorbent article, the method comprising: a supply process of supplying a gaseous substance which decomposes the superabsorbent polymers so as to be able to dissolve to a suction fluid supply port of an ejector, while supplying an aqueous solution which includes the mixed matter to a drive fluid supply port of the ejector, and a treatment process of reducing the superabsorbent polymers in the mixed matter by discharging a mixed solution in which the aqueous solution and the gaseous substance are mixed within the ejector, from a mixed fluid discharge port of the ejector which is connected to a lower portion of a treatment tank, into a treatment solution within the treatment tank.

According to the present method, each of the above-mentioned aqueous solution as a drive fluid and the above-mentioned gaseous substance as a suction fluid is supplied to the ejector, and is mixed inside the ejector, whereby a mixed solution as a mixed fluid in which the aqueous solution and the gaseous substance are very well mixed can be efficiently formed. That is, a mixed solution in which the mixed matter of pulp fibers and superabsorbent polymers and the gaseous substance are in extremely close contact with each other can be formed. Further, the mixed solution is discharged into the treatment solution inside the treatment tank, whereby the treatment solution can be stirred. Still further, when the gaseous substance is discharged into the treatment solution, the gaseous substance is discharged in a continuous manner in a state of fine bubbles, whereby can be diffused extremely widely inside the treatment solution. Accordingly, the reaction of the superabsorbent polymers and the gaseous substance can be made to proceed extremely efficiently not only for the pulp fibers which include the superabsorbent polymers inside the mixed solution to be discharged from the ejector but also for the pulp fibers which include the superabsorbent polymers within the treatment solution inside the treatment tank. Further, the superabsorbent polymers within the mixed matter are oxidatively decomposed in a suitable manner so as to dissolve into the treatment solution and to be removed, and further, the unevenness in the treatment of pulp fibers can be suppressed. Accordingly, the purity of the regenerated pulp fibers, that is, the recycled pulp fibers can be improved, and recycled pulp fibers which can be reused easily can be manufactured.

Therefore, it becomes possible to manufacture the recycled pulp fibers efficiently while suitably removing the superabsorbent polymers from the pulp fibers.

The present method may be as follows. (2) The method according to the above-mentioned (1) wherein the supply process includes a process of extracting at least a portion of the treatment solution which includes the mixed matter from a lower portion of the treatment tank, so as to supply the extracted treatment solution to the drive fluid supply port as the aqueous solution.

According to the present method, in the supply process, at least a portion of the treatment solution which includes the mixed matter is extracted from the lower portion of the treatment tank, and the extracted treatment solution is made to circulate to the upper portion of the treatment tank. That is, the treatment process is substantially performed multiple times. Accordingly, the reaction of the superabsorbent polymers and the gaseous substance can be made to proceed more reliably. Therefore, the superabsorbent polymers are oxidatively decomposed in a more suitable manner so as to dissolve into the treatment solution and to be removed, and the unevenness in the treatment of pulp fibers can be suppressed in a greater degree.

The present method may be as follows. (3) The method according to the above mentioned (1) or (2), further comprising: a pretreatment supply process of supplying the mixed matter into a pretreatment solution within a pretreatment tank before the supply process and the treatment process, a pretreatment process of reducing the superabsorbent polymers of the mixed matter by, inside the pretreatment tank, emitting a gaseous substance for pretreatment which decomposes the superabsorbent polymers so as to be able to dissolve by a gaseous substance emission portion within the pretreatment tank, from below the mixed matter, toward the mixed matter which is present inside the pretreatment solution separate from a bottom portion of the pretreatment tank, and a pretreatment solution transfer process of extracting at least a portion of the pretreatment solution which includes the mixed matter in which the superabsorbent polymers have been reduced in the pretreatment process, from a lower portion of the pretreatment tank, so as to transfer the extracted pretreatment solution from an upper portion of the treatment tank to the treatment solution.

In a case in which the amount of the superabsorbent polymers attached to the pulp fibers is large, it is possible that the viscosity of the mixed matter is to be relatively high by the superabsorbent polymers. In such a case, even by the treatment process in which an ejector with a high treatment efficiency is used, it is conceivable that the ejector is to be clogged with pulp fibers and superabsorbent polymers. Accordingly, in the present method, before the supply process and the treatment process, the superabsorbent polymers which are attached to the pulp fibers of the mixed matter are reduced by the pretreatment process. To be specific, the mixed matter within the aqueous solution which is supplied to the drive fluid supply port in the supply process is made to come into contact with the gaseous substance for pretreatment (for example: ozone gas) in the pretreatment process before the supply process. Accordingly, before the supply process, the pulp fibers and superabsorbent polymers, and the gaseous substance for pretreatment can be made to come into contact, whereby the superabsorbent polymers are oxidatively decomposed to some extent so as to dissolve into the pretreatment solution and to be removed. That is, in the pretreatment process, the superabsorbent polymers within the mixed matter can be reduced to some extent. Further, according to the present method, a portion of the pretreatment solution after the pretreatment process is transferred to the treatment solution, whereby the superabsorbent polymers within the mixed matter can be reduced also in the treatment solution. Accordingly, in the treatment process, the ejector can be suppressed from being clogged with the mixed matter within the aqueous solution, that is, the pulp fibers and superabsorbent polymers. Therefore, even when the amount of the mixed matter within the aqueous solution is increased, the mixed solution of the mixed matter and the gaseous substance is formed so as to be stably discharged into the treatment tank. Thus, it is possible to increase the mixed matter within the aqueous solution which can be treated by the treatment process and to manufacture the recycled pulp fibers more efficiently. Further, the superabsorbent polymers which are to be removed by the treatment process are reduced, whereby the unevenness in the treatment of pulp fibers can be suppressed in a greater degree. Accordingly, the purity of the regenerated pulp fibers, that is, the recycled pulp fibers can be improved, and recycled pulp fibers which can be reused easily can be manufactured. Therefore, it becomes possible to manufacture the recycled pulp fibers more efficiently while more suitably removing the superabsorbent polymers from the pulp fibers.

The present method may be as follows. (4) The method according to any one of the above-mentioned (1) to (3), further comprising: a pretreatment supply process of supplying the mixed matter into a pretreatment solution within a pretreatment tank, before the supply process and the treatment process, a pretreatment process of reducing the superabsorbent polymers of the mixed matter by, inside the pretreatment tank, emitting a gaseous substance for pretreatment which decomposes the superabsorbent polymers so as to be able to dissolve by a gaseous substance emission portion within the pretreatment tank, from below the mixed matter, toward the mixed matter which is present inside the pretreatment solution separate from a bottom portion of the pretreatment tank, and a pretreatment solution transfer process of extracting at least a portion of the pretreatment solution which includes the mixed matter in which the superabsorbent polymers have been reduced in the pretreatment process from a lower portion of the pretreatment tank, so as to transfer the extracted pretreatment solution to the drive fluid supply port.

In a case in which the amount of the superabsorbent polymers attached to the pulp fibers is large, it is possible that the viscosity of the mixed matter is to be relatively high by the superabsorbent polymers. In such a case, even by the treatment process in which an ejector with a high treatment efficiency is used, it is conceivable that the ejector is to be clogged with pulp fibers and superabsorbent polymers. Accordingly, in the present method, before the supply process and the treatment process, the superabsorbent polymers which are attached to the pulp fibers of the mixed matter are reduced by the pretreatment process. To be specific, the mixed matter within the aqueous solution which is supplied to the drive fluid supply port in the supply process is made to come into contact with the gaseous substance for pretreatment (for example: ozone gas) in the pretreatment process before the supply process. Accordingly, before the supply process, the pulp fibers and superabsorbent polymers, and the gaseous substance for pretreatment can be made to come into contact, whereby the superabsorbent polymers are oxidatively decomposed to some extent so as to dissolve into the pretreatment solution and to be removed. That is, in the pretreatment process, the superabsorbent polymers within the mixed matter can be reduced to some extent. Accordingly, in the treatment process, the ejector can be suppressed from being clogged with the mixed matter within the aqueous solution, that is, the pulp fibers and superabsorbent polymers. Therefore, even when the amount of the mixed matter within the aqueous solution is increased, the mixed solution of the mixed matter and the gaseous substance is formed so as to be stably discharged into the treatment tank. Thus, it is possible to increase the mixed matter within the aqueous solution which can be treated by the treatment process and to manufacture the recycled pulp fibers more efficiently. Further, the superabsorbent polymers which are to be removed by the treatment process are reduced, whereby the unevenness in the treatment of pulp fibers can be suppressed in a greater degree. Accordingly, the purity of the regenerated pulp fibers, that is, the recycled pulp fibers can be improved, and recycled pulp fibers which can be reused easily can be manufactured. Therefore, it becomes possible to manufacture the recycled pulp fibers more efficiently while more suitably removing the superabsorbent polymers from the pulp fibers.

The present method may be as follows. (5) The method according to the above-mentioned (3) or (4), wherein the pretreatment supply process includes a process of extracting at least a portion of the pretreatment solution which includes the mixed matter from a lower portion of the pretreatment tank, so as to supply the extracted pretreatment solution from an upper portion of the pretreatment tank into the pretreatment solution.

According to the present method, in the pretreatment supply process, at least a portion of the pretreatment solution is extracted from the lower portion of the pretreatment tank, and the extracted pretreatment solution is made to circulate to the upper portion of the pretreatment tank. That is, the pretreatment process is substantially performed multiple times. Accordingly, in the treatment process at the later stage, the ejector can be suppressed from being clogged with the mixed matter within the aqueous solution, that is, the pulp fibers and superabsorbent polymers. Therefore, even when the amount of the mixed matter within the aqueous solution is increased in a greater degree, the mixed solution of the mixed matter and the gaseous substance is formed so as to be more stably discharged into the treatment tank. Thus, it is possible to increase in a greater degree the mixed matter within the aqueous solution which can be treated by the treatment process and to manufacture the recycled pulp fibers more efficiently. Further, the superabsorbent polymers which are to be removed by the treatment process are reduced, whereby the unevenness in the treatment of pulp fibers can be suppressed in a greater degree.

The present method may be as follows. (6) The method according to any one of the above-mentioned (3) to (5), wherein the treatment tank and the pretreatment tank are the same tank, the treatment solution and the pretreatment solution are the same solution, the mixed fluid discharge port of the ejector is positioned at a lower portion of the tank with respect to the gaseous substance emission portion, and the pretreatment process is performed at an upper side of the tank, and the treatment process is performed at a lower side of the tank.

According to the present method, the pretreatment process and the treatment process can be performed in the same tank, and the mixed matter which has been performed with the pretreatment process need not be transferred to another tank so as to perform the treatment process, whereby the treatment efficiency can be improved.

The present method may be as follows. (7) The method according to any one of the above-mentioned (1) to (6), wherein the gaseous substance includes ozone.

According to the present method, the superabsorbent polymers which are included in the pulp fibers can be oxidatively decomposed by ozone, whereby the product by the oxidative decomposition can be made to reliably dissolve in the treatment solution. That is, the superabsorbent polymers can be suitably removed from the pulp fibers. As a result, the purity of the regenerated pulp fibers, that is, the recycled pulp fibers can be improved in a greater degree. Further, ozone is used as the gaseous substance, whereby the fibers can be bleached, and the color of the recycled pulp fibers can be approximated to white in a greater degree. Still further, ozone is used as the gaseous substance, whereby the pulp fibers can be sterilized, and the recycled pulp fibers can be made into a sanitary state in a greater degree. Accordingly, recycled pulp fibers which can be reused easily can be manufactured. Therefore, it becomes possible to manufacture the recycled pulp fibers efficiently while suitably removing the superabsorbent polymers from the pulp fibers.

The present method may be as follows. (8) The method according to any one of the above-mentioned (1) to (7), further comprising an inactivation process of inactivating an absorption performance of the superabsorbent polymers in the mixed matter, by treating the mixed matter by using an aqueous solution which is capable of inactivating the absorption performance of the superabsorbent polymers, before reducing the superabsorbent polymers in the mixed matter.

According to the present method, in the inactivation process, the absorption performance of the superabsorbent polymers is suppressed by an aqueous solution which is capable of inactivating the absorption performance of the superabsorbent polymers, whereby in the process at the later stage, the superabsorbent polymers can be oxidatively decomposed by the gaseous substance more easily and in a shorter amount of time. That is, the superabsorbent polymers can be removed from the pulp fibers more reliably. As the aqueous solution which is capable of inactivating the absorption performance of the superabsorbent polymers, for example, an acidic aqueous solution (for example: pH 2.5 or lower) may be mentioned. Since the acidic aqueous solution is highly effective for inactivating the superabsorbent polymers, the absorption performance of the superabsorbent polymers can be suppressed more reliably at the stage of the inactivation process.

The apparatus of manufacturing recycled pulp fibers according to the present invention is as follows. (9) An apparatus of manufacturing recycled pulp fibers from mixed matter of pulp fibers and superabsorbent polymers which is separated from a used absorbent article, the apparatus comprising: an ejector which includes a drive fluid supply port, a suction fluid supply port, and a mixed fluid discharge port, an aqueous solution supply portion which supplies an aqueous solution which includes the mixed matter to the drive fluid supply port, a gaseous substance supply portion which supplies a gaseous substance which decomposes the superabsorbent polymers so as to be able to dissolve to the suction fluid supply port, and a treatment tank in which a mixed solution which includes a treatment solution and in which the aqueous solution and the gaseous substance are mixed inside the ejector, is supplied from the mixed fluid discharge port which is connected to a lower portion into the treatment solution.

The present apparatus can perform the method described in the above-mentioned (1), whereby can obtain the same effect as such method.

The present apparatus may be as follows. (10) The apparatus according to the above-mentioned (9), wherein the treatment tank includes a treatment solution circulation portion which extracts at least a portion of the treatment solution which includes the mixed matter from the lower portion of the treatment tank, so as to supply the extracted treatment solution to the drive fluid supply port as the aqueous solution.

The present apparatus can perform the method described in the above-mentioned (2), whereby can obtain the same effect as such method.

The present apparatus may be as follows. (11) The apparatus according to the above-mentioned (9) or (10), further comprising: a pretreatment tank which includes a pretreatment solution, a gaseous substance emission portion which is provided inside the pretreatment tank, and reduces the superabsorbent polymers of the mixed matter by, within the pretreatment solution, emitting a gaseous substance for pretreatment which decomposes the superabsorbent polymers so as to be able to dissolve, from below the mixed matter, toward the mixed matter which is present inside the pretreatment solution separate from a bottom portion of the pretreatment tank, and a pretreatment solution transfer portion which extracts at least a portion of the pretreatment solution which includes the mixed matter in which the superabsorbent polymers have been reduced in the pretreatment tank, from a lower portion of the pretreatment tank, so as to transfer the extracted pretreatment solution from an upper portion of the treatment tank to the treatment solution.

The present apparatus can perform the method described in the above-mentioned (3), whereby can obtain the same effect as such method.

The present apparatus may be as follows. (12) The apparatus according to any one of the above-mentioned (9) to (11), further comprising: a pretreatment tank which includes a pretreatment solution, a gaseous substance emission portion which is provided inside the pretreatment tank, and reduces the superabsorbent polymers of the mixed matter by, within the pretreatment solution, emitting a gaseous substance for pretreatment which decomposes the superabsorbent polymers so as to be able to dissolve, from below the mixed matter, toward the mixed matter which is present inside the pretreatment solution separate from a bottom portion of the pretreatment tank, and a pretreatment solution transfer portion which extracts at least a portion of the pretreatment solution which includes the mixed matter in which the superabsorbent polymers have been reduced in the pretreatment tank, from a lower portion of the pretreatment tank, so as to transfer the extracted pretreatment solution to the drive fluid supply port.

The present apparatus can perform the method described in the above-mentioned (4), whereby can obtain the same effect as such method.

The present apparatus may be as follows. (13) The apparatus according to the above-mentioned (11) or (12), wherein the pretreatment tank includes a pretreatment solution circulation portion which extracts at least a portion of the pretreatment solution which includes the mixed matter from the lower portion of the pretreatment tank, so as to supply the extracted pretreatment solution from an upper portion of the pretreatment tank into the pretreatment solution.

The present apparatus can perform the method described in the above-mentioned (5), whereby can obtain the same effect as such method.

The present apparatus may be as follows. (14) The apparatus according to any one of the above-mentioned (11) to (13), wherein the treatment tank and the pretreatment tank are the same tank, the treatment solution and the pretreatment solution are the same solution, and the mixed fluid discharge port of the ejector is positioned at a lower portion of the tank with respect to the gaseous substance emission portion.

The present apparatus can perform the method described in the above-mentioned (6), whereby can obtain the same effect as such method.

Advantageous Effects of Invention

According to the method of the present invention, in the method of manufacturing recycled pulp fibers by removing superabsorbent polymers from pulp fibers which include superabsorbent polymers, it is possible to manufacture the recycled pulp fibers efficiently while suitably removing the superabsorbent polymers from the pulp fibers.

DESCRIPTION OF EMBODIMENTS

First Embodiment

Figure 1:
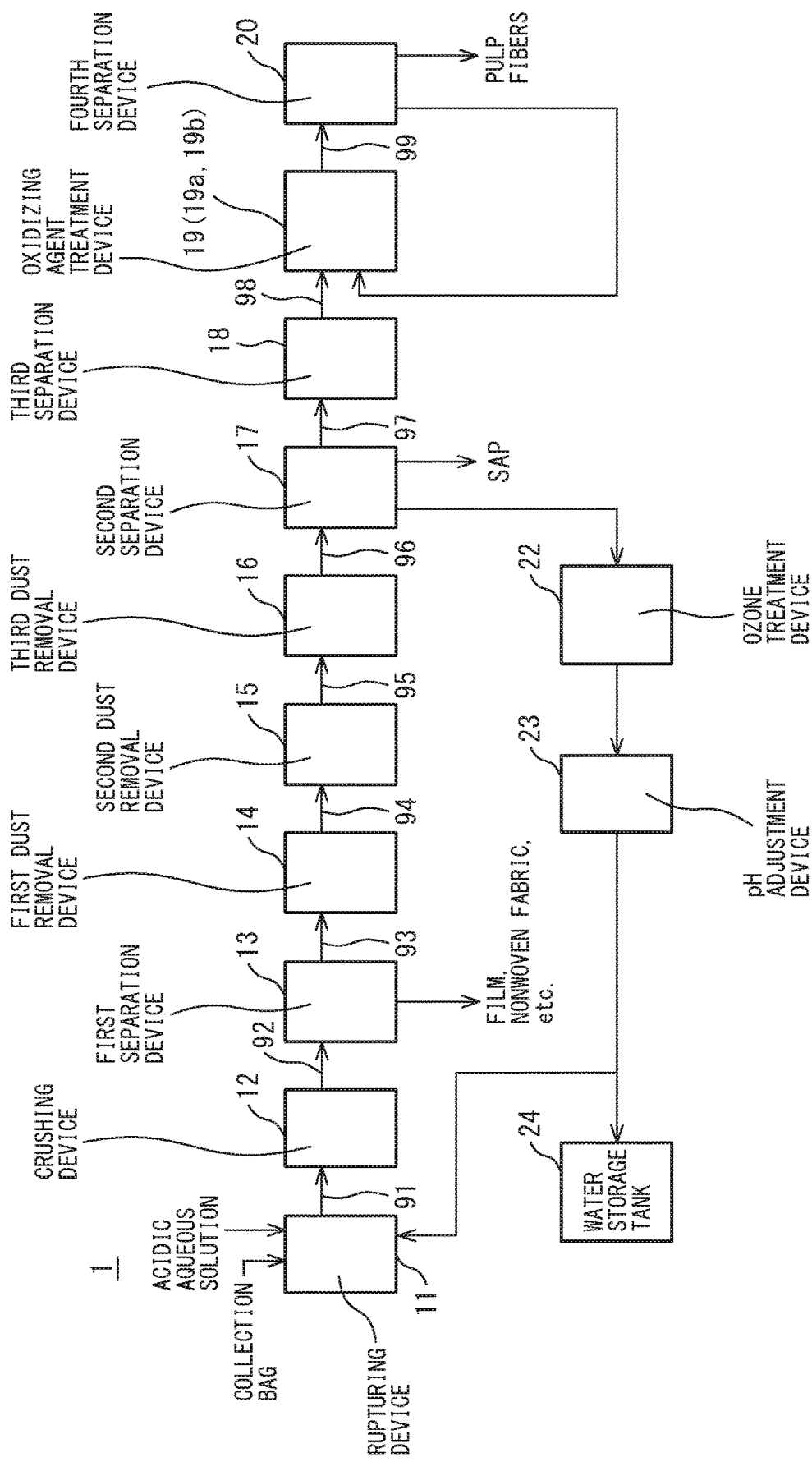
FIG. 1 is a block diagram showing an example of a system according to an embodiment.

Hereinbelow, the method and the apparatus of manufacturing recycled pulp fibers from mixed matter of pulp fibers and superabsorbent polymers which is separated from a used absorbent article, according to the first embodiment is explained. It should be noted that a used absorbent article includes an absorbent article which has been used by a user and is in a state in which excrement of the user is absorbed and retained, and further includes an absorbent article which has been used and is in a state in which excrement is not absorbed or retained, and still further includes an absorbent article which has not been used and is discarded. As an absorbent article, for example, a diaper, a urine collection pad, a sanitary napkin, a bed sheet, a pet sheet, may be mentioned.

First, the configurational example of the absorbent article is explained. The absorbent article includes a top sheet, a back sheet, and an absorbent body which is arranged between the top sheet and the back sheet. As one example of the size of the absorbent article, a length of approximately 15 to 100 cm, and a width of 5 to 100 cm, may be mentioned. Incidentally, the absorbent article may include other members which are provided in general absorbent articles, for example, a diffusion sheet, a leakage prevention wall, etc.

As the configuration member of the top sheet, for example, a liquid permeable nonwoven fabric, synthetic resin film with liquid permeable holes, a composite sheet thereof, etc., may be mentioned. As the configuration member of the back sheet, for example, a liquid impermeable nonwoven fabric, a liquid impermeable synthetic resin film, a composite sheet thereof, etc., may be mentioned. As the configuration member of the diffusion sheet, for example, a liquid permeable nonwoven fabric, etc., may be mentioned. As the configuration member of the leakage prevention wall, for example, a liquid impermeable nonwoven fabric may be mentioned, and may include an elastic member such as rubber. The material of a nonwoven fabric or a synthetic resin film is not particularly limited as long as it can be used for an absorbent article. As such a material, for example, olefin-based resin such as polyethylene, polypropylene, etc., polyamide-based resin such as 6-nylon, 6,6-nylon, etc., polyester-based resin such as polyethylene terephthalate (PET), polybutylene terephthalate (PBT), etc., may be mentioned. In the present embodiment, an example of an absorbent article in which the configurational member of the back sheet is a film and the configurational member of the top sheet is a nonwoven fabric is explained.

As the configurational member of the absorbent body, absorbent materials, that is, pulp fibers and superabsorbent polymers may be mentioned. The pulp fibers are not particularly limited as long as they can be used for an absorbent article, and for example, cellulose-based fibers may be mentioned. As the cellulose-based fibers, for example, wood pulp, cross-linked pulp, non-wood pulp, regenerated cellulose, semi-synthetic cellulose, etc., may be mentioned. As the size of pulp fibers, the average value of a major axis of fibers of, for example, several tens of μm may be mentioned, and 20 to 40 μm is preferable, and the average value of fiber lengths of, for example, several mm may be mentioned, and 2 to 5 mm is preferable. The superabsorbent polymers (SAP) are not particularly limited as long as they can be used for an absorbent article, and for example, absorbent polymers of polyacrylate-based, polysulfonate-based, and maleic anhydride-based, may be mentioned. As the size of superabsorbent polymers (when dry), the average value of particle diameters of, for example, several hundreds of μm may be mentioned, and 200 to 500 μm is preferable.

One surface and the other surface of the absorbent body are joined to the top sheet and the back sheet, respectively, through an adhesive agent. In a plan view, the portion which extends toward the outer side of the absorbent body so as to surround the absorbent body among the top sheet (the peripheral portion) is joined to the portion which extends toward the outer side of the absorbent body so as to surround the absorbent body among the back sheet (the peripheral portion), through an adhesive agent. Accordingly, the absorbent body is wrapped inside the joined body of the top sheet and the back sheet. The adhesive agent is not particularly limited as long as it can be used for an absorbent article, and for example, a hot melt-type adhesive agent may be mentioned. As a hot melt-type adhesive agent, for example, a pressure-sensitive or heat-sensitive adhesive agent of a rubber-based such as styrene-ethylene-butadiene-styrene, styrene-butadiene-styrene, styrene-isoprene-styrene, etc., or of olefin-based such as polyethylene, etc., may be mentioned.

Next, the method and the apparatus of manufacturing recycled pulp fibers from mixed matter of pulp fibers and superabsorbent polymers which is separated from a used absorbent article, according to the embodiment is explained. In the present embodiment, used absorbent articles are recovered or obtained from outside for the purpose of recycling, the mixed matter of pulp fibers and superabsorbent polymers is separated from the used absorbent articles which have been recovered, etc., and the separated mixed matter is used for the manufacturing of the recycled pulp fibers. At this time, a plurality of used absorbent articles are collected and encapsulated in bags for collection (hereinbelow, which are referred to as "collection bags") so that dirt and fungi of excrement do not leak outside, whereby are recovered, etc. Each of the used absorbent articles is in a state of being rolled or folded with the top sheet placed on the inner side, so that odor and excrement are not spread to the surroundings.

First, the system 1 which is used for the method of manufacturing recycled pulp fibers from mixed matter of pulp fibers and superabsorbent polymers which is separated from a used absorbent article is explained. The system 1 is a system which recovers pulp fibers from a used absorbent article, and thus is a system which manufactures recycled pulp fibers. FIG. 1 is a block diagram which shows one example of the system 1 according to the present embodiment. The system 1 includes the oxidizing agent treatment device 19, and preferably further includes the rupturing device 11, the crushing device 12, the first separation device 13, the first dust removal device 14, the second dust removal device 15, the third dust removal device 16, the second separation device 17, the third separation device 18, and the fourth separation device 20.

The rupturing device 11 punches a hole in a collection bag in which used absorbent articles are encapsulated within the inactivation aqueous solution. The rupturing device 11 includes, for example, a solution tank, a stirring machine, and a crushing blade. The solution tank stores the inactivation aqueous solution. The stirring machine is provided inside the solution tank, stirs the inactivation aqueous solution, so that a swirling flow is caused. The crushing blade is provided on the lower portion of the solution tank, and punches a hole in the collection bags which are withdrawn to the lower side of the inactivation aqueous solution inside the solution tank by the swirling flow. It should be noted that the inactivation aqueous solution is an aqueous solution which inactivates the superabsorbent polymers. By the inactivation, the absorption performance of the superabsorbent polymers is lowered. As a result, the superabsorbent polymers releases water up to an amount acceptable by the absorption performance, that is, dehydrate. Hereinbelow, an example of a case in which an acidic aqueous solution is used as the inactivation aqueous solution is explained.

The crushing device 12 crushes the used absorbent articles together with the collection bag which have sunk under the water surface of the acidic aqueous solution. The crushing device 12 includes, for example, a crushing portion and a pump. The crushing portion is connected to the solution tank, and the used absorbent articles inside the collection bag which have been delivered together with the acidic aqueous solution (the mixed solution 91) from the solution tank are crushed within the acidic aqueous solution together with the collection bag. As the crushing portion, a biaxial crushing device (for example: a biaxial rotation-type crushing machine, a biaxial differential-type crushing machine, a biaxial shear-type crushing machine) may be mentioned, and to be specific, a SUMICUTTER (manufactured by Sumitomo Heavy Industries Environment Co., Ltd.) may be mentioned. The pump is connected to the downstream side of the crushing portion, and withdraws the crushed matter which is obtained by the crushing portion together with the acidic aqueous solution (the mixed solution 92) from the crushing portion, and delivers the same to the subsequent process. Note that the crushed matter includes the pulp fibers, the superabsorbent polymers, and other materials (the materials of the collection bag, films, nonwoven fabric, elastic bodies, etc.).

The first separation device 13 stirs the mixed solution 92 which includes the crushed matter obtained by the crushing device 12 and the acidic aqueous solution, and while performing the washing so as to remove the dirt of the excrement, etc., from the crushed matter, the pulp fibers, the superabsorbent polymers and the acidic aqueous solution are separated from the mixed solution 92 (the mixed solution 93), and delivers the same to the first dust removal device 14. As the first separation device 13, for example, a washing machine including a washing and dehydrating tank and a water tank surrounding the washing and dehydrating tank, may be mentioned, and to be specific, a horizontal-type washing machine ECO-22B (manufactured by Inamoto Co., Ltd.) may be mentioned. The washing and dehydrating tank (a rotating drum) is used as a washing and sieving tank (separating tank). The size of the plurality of penetrating holes provided in the peripheral surface of the washing tank is set, in a case of round holes, to a diameter of 5 to 20 mmϕ, and in a case of slits, a width of 5 to 20 mm.

The first dust removal device 14 separates the acidic aqueous solution (the mixed solution 93) which includes the pulp fibers and the superabsorbent polymers delivered from the first separation device 13 into the pulp fibers and the superabsorbent polymers within the acidic aqueous solution (the mixed solution 94) and the other materials (the foreign matter) by a screen which has a plurality of openings. Maintaining the pH of the acidic aqueous solution within a predetermined range is preferable from the viewpoint of inactivating (including the adjustment of the size and the specific gravity) of the superabsorbent polymers. The predetermined range is the range in which the variation of pH is within ±1.0, and the pH is adjusted by adding acidic solution, etc., if necessary. As the first dust removal device 14, for example, a screen separating machine may be mentioned, and to be specific, Pack Pulper (manufactured by Satomi Corporation), may be mentioned. The size of the openings of the screen (the sieve) is set, for example, in a case of round holes, to a diameter of 2 to 5 mmϕ, and in a case of slits, a width of 2 to 5 mm. Other materials (the foreign matter) of at least approximately 10 mm square or more can be removed.

The second dust removal device 15 separates the acidic aqueous solution (the mixed solution 94) which includes the pulp fibers and the superabsorbent polymers delivered from the first dust removal device 14 into the pulp fibers and the superabsorbent polymers within the acidic aqueous solution (the mixed solution 95) and the other materials (the foreign matter) by a screen which has a plurality of openings. It is preferable that the pH of the acidic aqueous solution is maintained in the above-mentioned predetermined range. As the second dust removal device 15, for example, a screen separating machine may be mentioned, and to be specific, Ramoscreen (manufactured by Aikawa Iron Works Co., Ltd.), may be mentioned. The size of the openings of the screen (the sieve) is set, for example, in a case of slits, to a width of 0.2 to 0.5 mm, and in a case of round holes, a diameter of 0.2 to 0.5 mmϕ. Other materials of at least approximately 3 mm square or more can be removed.

The third dust removal device 16 separates the acidic aqueous solution (the mixed solution 95) which includes the pulp fibers and the superabsorbent polymers delivered from the second dust removal device 15 into the pulp fibers and the superabsorbent polymers within the acidic aqueous solution (the mixed solution 96) and the other materials (the foreign matter with a larger specific gravity) by a centrifugal separation. It is preferable that the pH of the acidic aqueous solution is maintained in the above-mentioned predetermined range. As the third dust removal device 16, for example, a cyclone separating machine may be mentioned, and to be specific, ACT low concentration cleaner (manufactured by Aikawa Iron Works Co., Ltd.), may be mentioned. In order that the pulp fibers and the superabsorbent polymers within the acidic aqueous solution which have relatively smaller specific gravity is raised, and foreign matter which has larger specific gravity (such as metal, etc.) is let to descend, the acidic aqueous solution (the mixed solution 95) which includes the pulp fibers and the superabsorbent polymers is supplied into a conical housing placed in an up-side down manner of the third dust removal device 16 in a predetermined flow rate.

The second separation device 17 separates the acidic aqueous solution (the mixed solution 96) which includes the pulp fibers and the superabsorbent polymers delivered from the third dust removal device 16 into the pulp fibers within the acidic aqueous solution (the mixed solution 97) and the superabsorbent polymers within the acidic aqueous solution by a screen which has a plurality of openings. As the second separation device 17, for example, a drum screen separating machine may be mentioned, and to be specific, a drum screen dehydrator (manufactured by Toyo Screen Co., Ltd.), may be mentioned. The size of the openings of the drum screen is set, for example, in a case of slits, to a width of 0.2 to 0.8 mm, and in a case of round holes, a diameter of 0.2 to 0.8 mmϕ. At least a considerable amount of superabsorbent polymers can be removed.

The third separation device 18, while separating the pulp fibers delivered from the second separation device 17, the superabsorbent polymers which have remained without being separated and the acidic aqueous solution (the mixed solution 97) into solid (the mixed matter 98) which includes the pulp fibers and the superabsorbent polymers and liquid which includes the superabsorbent polymers and the acidic aqueous solution by a screen which has a plurality of openings, applies pressure to the solid so as to crush the superabsorbent polymers in the solid. Note that the solid includes a slight amount of the acidic aqueous solution. As the third separation device 18, for example, a screw press dehydrating machine may be mentioned, and to be specific, a screw press dehydrator (manufactured by Kawaguchi Seiki Co., Ltd.), may be mentioned. The size of the openings of the drum screen is set, for example, in a case of slits, to a width of 0.1 to 0.5 mm, and in a case of round holes, a diameter of 0.1 to 0.5 mmϕ. The third separation device 18, while delivering the liquid which includes the superabsorbent polymers and the acidic aqueous solution from the slits on the side surface of the drum screen, delivers the solid which includes the pulp fibers and the superabsorbent polymers from the gap of the lid body at the tip of the drum screen in which the pressure is adjusted while crushing the superabsorbent polymers. As the pressure which is applied to the lid body, for example, 0.01 MPa or more and 1 MPa or less, may be mentioned.

The rupturing device 11 to the third separation device 18 may be regarded as the devices of preparing the mixed matter 98 of pulp fibers and superabsorbent polymers which is separated from the used absorbent article. The devices of preparing the mixed matter 98 of pulp fibers and superabsorbent polymers which is separated from the used absorbent article are not limited to each of the devices mentioned-above, and may be other devices as long as the mixed matter of pulp fibers and superabsorbent polymers which derives from the used absorbent article can be obtained.

The oxidizing agent treatment device 19 treats the pulp fibers which include the crushed superabsorbent polymers in the solid delivered from the third separation device 18 (the mixed matter 98) with an aqueous solution (the treatment solution) which includes a gaseous substance which decomposes the superabsorbent polymers so as to be able to dissolve (for example, an oxidizing agent). Accordingly, the oxidizing agent treatment device 19 performs oxidative decomposition for the superabsorbent polymers so as to dissolve into the treatment solution and be removed from the pulp fibers, and delivers the pulp fibers which do not include the superabsorbent polymers together with the treatment solution (the mixed solution 99).

Figure 2:
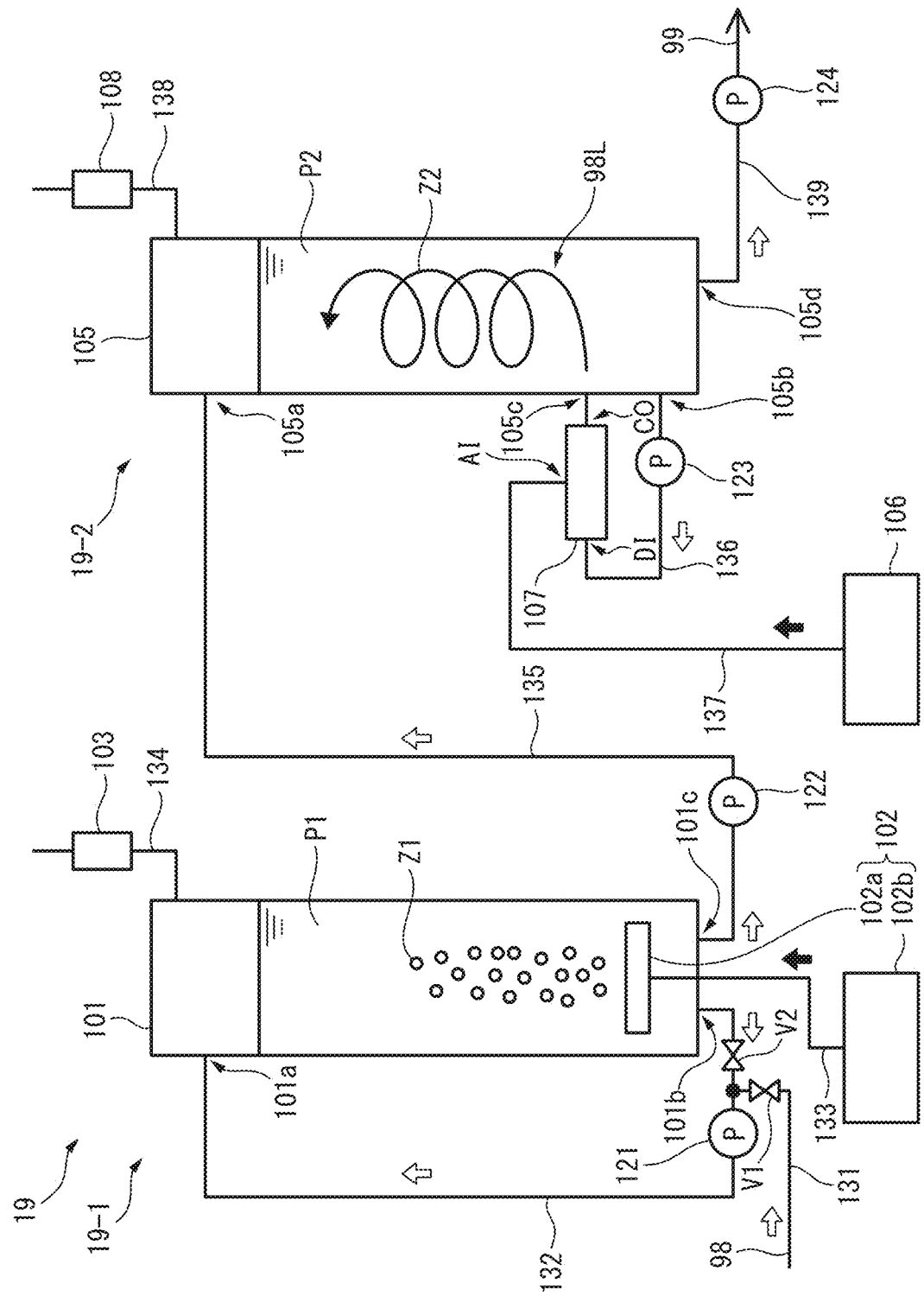
FIG. 2 is a schematic diagram showing a configuration example of an oxidizing agent treatment device according to a first embodiment.

FIG. 2 is a schematic diagram which shows a configuration example of the oxidizing agent treatment device 19. The oxidizing agent treatment device 19 includes the pretreatment device 19-1 and the treatment device 19-2. The pretreatment device 19-1 removes at least a portion of the superabsorbent polymers from the pulp fibers of the mixed matter 98. Accordingly, the pretreatment device 19-1 makes the viscosity of the pulp fibers which includes the superabsorbent polymers of the mixed matter 98 be lowered. The treatment device 19-2 further removes the superabsorbent polymers from the pulp fibers of the mixed matter 98 in which at least a portion of the superabsorbent polymers is removed and the viscosity is lowered by the pretreatment device 19-1.

The pretreatment device 19-1 includes the pretreatment tank 101, the gaseous substance emission device 102, the pump 122 (the pretreatment solution transfer portion), the pump 121 (the pretreatment solution circulation portion), and the gaseous substance decomposition device 103.

The pretreatment tank 101 is the tank which includes the pretreatment solution P1. The pretreatment solution P1 is, for example, initially water, and as the treatment of the pretreatment device 19-1 proceeds, the gaseous substance for pretreatment Z1 (which will be described later) may dissolve therein, or the gaseous substance Z1 may be dissolved therein in advance.

The gaseous substance emission device 102 is the device for emitting the gaseous substance for pretreatment Z1 into the pretreatment solution P1 inside the pretreatment tank 101, and includes the gaseous substance emission portion 102*a* and the gaseous substance generation portion 102*b*. The gaseous substance generation portion 102*b* generates the gaseous substance for pretreatment Z1 which decomposes the superabsorbent polymers so as to dissolve into the pretreatment solution P1. The gaseous substance Z1 is a gaseous substance which includes an oxidizing agent, and as such an oxidizing agent, for example, a gaseous ozone, chlorine dioxide, may be mentioned, and the oxidizing agent is preferably ozone from the viewpoint of the oxidizing power, etc. The gaseous substance emission portion 102*a* is provided inside the pretreatment tank 101, and in the pretreatment solution P1, emits the gaseous substance for pretreatment Z1 from below the mixed matter 98 toward the mixed matter 98 (the pulp fibers which includes the superabsorbent polymers) which is present within the pretreatment solution P1 separate from the bottom portion of the pretreatment tank 101. The gaseous substance Z1 is emitted, for example, in a state of a number of fine bubbles. Accordingly, the superabsorbent polymers of the mixed matter 98 are oxidatively decomposed, and dissolve into the pretreatment solution P1, so as to be reduced. That is, the superabsorbent polymers of the pulp fibers are reduced, and the viscosity of the pulp fibers which include the superabsorbent polymers is reduced.

Incidentally, the oxidizing agent need not be gas, and may be a liquid or a solid which is melted in a liquid, and as such an oxidizing agent, for example, peracetic acid, sodium hypochlorite, hydrogen peroxide, may be mentioned. In such a case, the gaseous substance emission portion 102*a* emits the liquid in which the oxidizing agent is melted.

The pump 122 (the pretreatment solution transfer portion) is provided in the middle of the pipe 135 which connects the delivery port 101*c* which is provided at the lower portion of the pretreatment tank 101 and the supply port 105*a* which is provided at the upper portion of the treatment tank 105 (which is described later) of the treatment device 19-2. The pump 122 extracts at least a portion of the pretreatment solution P1 which includes the mixed matter 98 in which the superabsorbent polymers are reduced in the pretreatment tank 101 from the lower portion of the pretreatment tank 101, and transfers the extracted pretreatment solution P1 from the upper portion of the treatment tank 105 to the treatment solution P2.

The pump 121 (the pretreatment solution circulation portion) is provided in the middle of the pipe 132 which connects the delivery port 101*b* which is provided at the lower portion of the pretreatment tank 101 and the supply port 101*a* which is provided at the upper portion of the pretreatment tank 101. The pump 121 extracts at least a portion of the pretreatment solution P1 which includes the mixed matter 98 from the lower portion of the pretreatment tank 101, and supplies the extracted pretreatment solution P1 from the upper portion of the pretreatment tank 101 to the pretreatment solution P1. Incidentally, the pump 121 receives the aqueous solution in which the mixed matter 98 and water are mixed through the pipes 131, 132, and supplies the received aqueous solution from the supply port 101*a* to the pretreatment tank 101 through the pipe 132. The distribution of liquid through the pipes 131, 132 is controlled by the valve V1 of the pipe 131 and the valve V2 of the pipe 132.

The gaseous substance decomposition device 103 receives the gaseous substance Z1 which is accumulated in the upper portion of the pretreatment tank 101 through the pipe 134, decomposes, detoxifies, and releases the gaseous substance to the outside.

Incidentally, the pretreatment solution P1 inside the pretreatment tank 101 is initially only the pretreatment solution P1, and after the treatment begins, the pretreatment solution P1 is to be a liquid in which the pretreatment solution P1, the mixed matter 98 and the gaseous substance for pretreatment Z1 are mixed, and in the present embodiment, the liquid inside the pretreatment tank 101, including such mixed liquid, is regarded as the pretreatment solution P1.

The treatment device 19-2 includes the treatment tank 105, the gaseous substance supply device (the gaseous substance supply portion) 106, the ejector 107, the pump 123 (the aqueous solution supply portion, the treatment solution circulation portion), the pump 124, and the gaseous substance decomposition device 108.

The treatment tank 105 is the tank which includes the treatment solution P2, and preferably has a cylindrical shape from the viewpoint that it is easier for the mixed solution 98L (which is described later) which is discharged from the ejector 107 to make a swirling flow occur in the treatment solution P2. The treatment solution P2 is, for example, initially water, and as the treatment of the treatment device 19-2 proceeds, the gaseous substance for pretreatment Z2 (which will be described later) may dissolve therein, and as the treatment of the pretreatment device 19-1 proceeds, the pretreatment solution P1 which includes the mixed matter 98 (superabsorbent polymers and pulp fibers) is included therein. Alternatively, the gaseous substance Z2 may be dissolved therein in advance.

The gaseous substance supply device 106 generates the gaseous substance Z2 which decomposes the superabsorbent polymers so as to be able to dissolve into the treatment solution P2, and supplies the generated gaseous substance Z2 to the ejector 107. The gaseous substance Z2 is similar to the gaseous substance Z1, but may be different in types of the substance.

The pump 123 (the aqueous solution supply portion, treatment solution circulation portion) supplies the aqueous solution which includes the mixed matter 98 of superabsorbent polymers and pulp fibers to the ejector 107. The pump 123 is provided in the middle of the pipe 136, and the pipe 136 connects the delivery port 105b which is provided at the lower portion of the treatment tank 105 and the supply port 105c which is provided at the lower portion of the treatment tank 105 and above the delivery port 105b. The pipe 136 in the vicinity of the supply port 105c is preferably tilted upwards from the viewpoint that it is easier for the mixed solution 98L which is discharged from the ejector 107 to make a swirling flow formed in the treatment solution P2 be raised.

The ejector 107 (the aspirator) is provided in the middle of the pipe 136, and includes the drive fluid supply port DI, the suction fluid supply port AI, and the mixed fluid discharge port CO. The ejector 107 makes the drive fluid flow from the drive fluid supply port DI to the mixed fluid discharge port CO, makes the narrowed portion in the middle of the flow path be in a state in which the pressure is reduced by the Venturi effect, draws the suction fluid from the suction fluid supply port AI to the narrowed portion so as to be mixed with the drive fluid, and discharges the same as the mixed fluid from the mixed fluid discharge port CO. In this configuration, the treatment solution P2 which includes superabsorbent polymers and pulp fibers (the mixed matter) in the treatment tank 105 is supplied to the drive fluid supply port DI and is flowed toward the mixed fluid discharge port CO by the pump 123. Accompanied therewith, the gaseous substance Z2 from the gaseous substance supply device 106 is suctioned to the inside of the ejector 107 from the suction fluid supply port AI. Accordingly, the treatment solution P2 which includes superabsorbent polymers and pulp fibers and the gaseous substance Z2 are mixed, and are discharged to the treatment tank 105 from the mixed fluid discharge port CO as the mixed solution 98L. The discharged mixed solution rotates inside the treatment tank 105 while the superabsorbent polymers are oxidatively decomposed by the gaseous substance Z2 so as to be removed, and is raised upwards gradually while stirring the treatment solution P2.

The pump 124 is provided in the middle of the pipe 139 which connects the delivery port 105d which is provided at the lower portion of the treatment tank 105 and the equipment at the later stage (which is not shown). The pump 124 extracts at least a portion of the treatment solution P2 which includes the mixed matter 98 in which the superabsorbent polymers are removed in the treatment tank 105 from the lower portion of the treatment tank 105, and transfers the extracted treatment solution P2 to the equipment at the later stage.

The gaseous substance decomposition device 108 receives the gaseous substance Z2 which is accumulated in the upper portion of the treatment tank 105 through the pipe 138, decomposes, detoxifies, and releases the gaseous substance Z2 to the outside.

Incidentally, the treatment solution P2 inside the treatment tank 105 is initially only the treatment solution P2, and after the treatment begins, the treatment solution P2 is to be a liquid in which the treatment solution P2, the mixed matter and the gaseous substance are mixed, and in the present embodiment, the liquid inside the treatment tank 105, including such mixed liquid, is regarded as the treatment solution P2.

In the oxidizing agent treatment device 19, the reason why both the pretreatment device 19-1 and the treatment device 19-2 are used is as follows. From the viewpoint of the treatment efficiency, it is preferable to use only the treatment device 19-2 which includes the ejector 107. However, in the aqueous solution which includes the mixed matter, which is supplied to the oxidizing agent treatment device 19, when the concentration of the superabsorbent polymers attached to the pulp fibers is high, it is conceivable that the viscosity of the mixed matter 98 is increased, and the ejector 107 is clogged. Accordingly, in order to deal with such an issue, in the present embodiment, first, the aqueous solution which includes the mixed matter 98 is treated by the pretreatment device 19-1, whereby the viscosity of the mixed matter 98 is lowered to a degree so that the ejector 107 is not clogged. That is, the superabsorbent polymers are reduced.

Subsequently, the fourth separation device 20 separates the treatment solution which includes the pulp fibers treated by the oxidizing agent treatment device 19 (the mixed solution 99) by a screen which has a plurality of openings, into the treatment solution and the pulp fibers. Accordingly, the pulp fibers are recovered, and the recycled pulp fibers are generated. As the fourth separation device 20, for example, a screen separating machine may be mentioned. The size of the openings of the screen (the sieve) is set, for example, in a case of slits, to a width of 0.2 to 0.8 mm, and in a case of round holes, a diameter of 0.2 to 0.8 mmφ.

Incidentally, the system 1 includes, preferably, as the devices for regenerating and reusing the acidic aqueous solution which is used in the system 1, the ozone treatment device 22, the pH adjustment device 23, and the water storage tank 24. By reusing the acidic aqueous solution, the cost of the acidic aqueous solution can be reduced. The ozone treatment device 22 performs the sterilization treatment for the acidic aqueous solution in which the superabsorbent polymers are further separated from the superabsorbent polymers and the acidic aqueous solution which are separated by the second separation device 17, by an ozone containing aqueous solution. The pH adjustment device 23 adjusts pH of the acidic aqueous solution which has been performed with the sterilization treatment by the ozone containing aqueous solution, so as to generate the regenerated acidic aqueous solution. The water storage tank 24 stores the surplus among the regenerated acidic aqueous solution.

Figure 3:
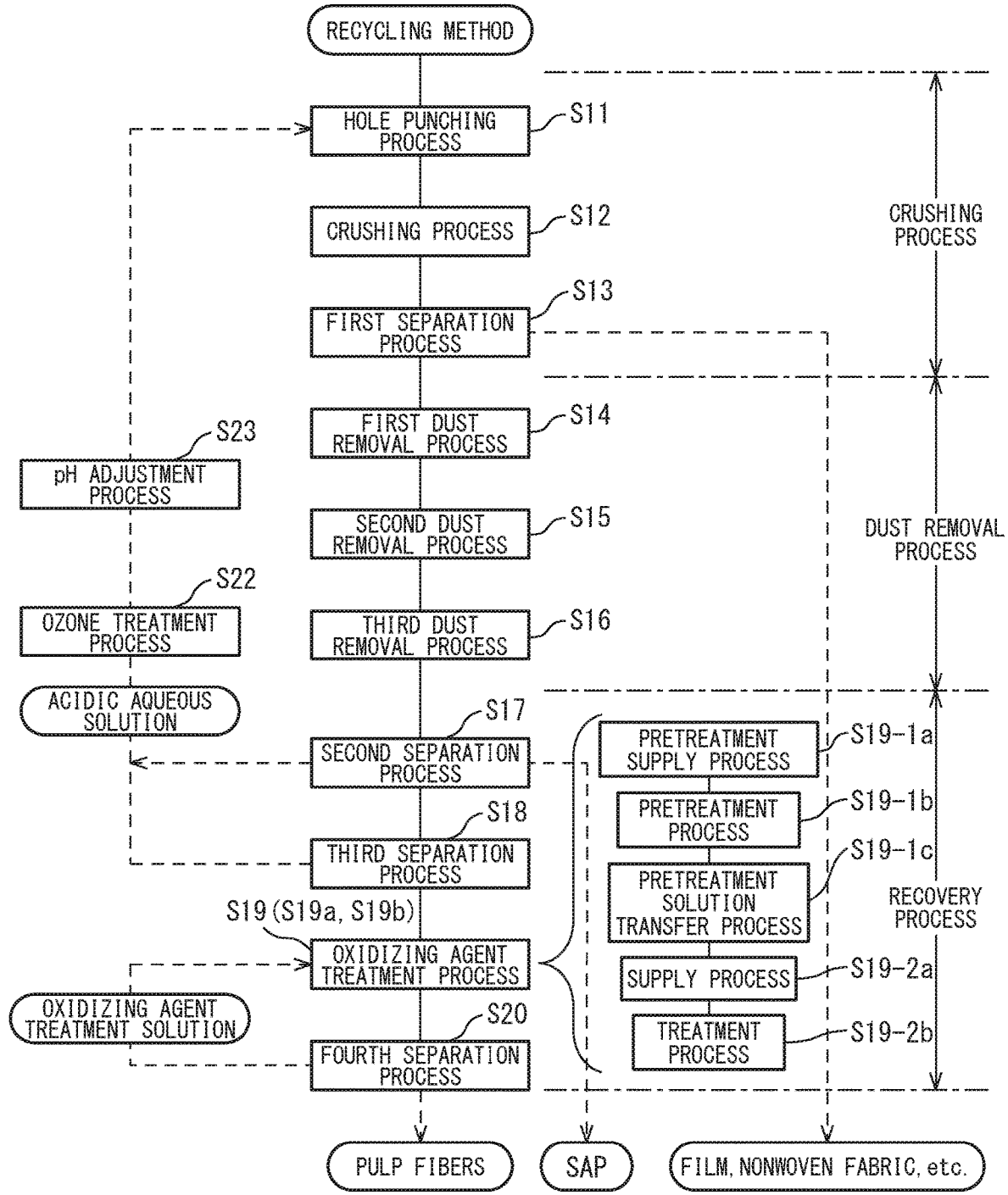
FIG. 3 is a flow chart showing an example of a method according to an embodiment.

Next, the method of manufacturing recycled pulp fibers from the mixed matter of pulp fibers and superabsorbent polymers which is separated from a used absorbent article is explained. This method is a method which recovers pulp fibers from a used absorbent article, and thus is a method which generates recycled pulp fibers. FIG. 3 is a flow chart which shows one example of the method according to the present embodiment. This method includes the oxidizing agent treatment process S19, and preferably includes the hole punching process S11 the crushing process S12, the first separation process S13, the first dust removal process S14, the second dust removal process S15, the third dust removal process S16, the second separation process S17, the third separation process S18, and the fourth separation process S20. Hereinbelow, explanations are given in detail.

The hole punching process S11 is performed by the rupturing device 11. The collection bags in which the used absorbent articles are encapsulated are thrown into the solution tank in which the acidic aqueous solution is stored, and a hole is punched in the surface of the collection bag which comes into contact with the acidic aqueous solution. When the hole is punched in the collection bag, the acidic aqueous solution surrounds and seals the collection bag so that the dirt, fungi and odor of the used absorbent articles inside the collection bag are not released outside. When the acidic aqueous solution enters inside the collection bag from the hole, the gas inside the collection bag exits to the outside of the collection bag, the specific gravity of the collection bag is to be larger than that of the acidic aqueous solution, and the collection bag sinks more deeply inside the acidic aqueous solution of the solution tank. Further, the acidic aqueous solution inactivates the superabsorbent polymers inside the used absorbent articles inside the collection bag.

The superabsorbent polymers inside the used absorbent articles are inactivated and the absorption performance thereof is reduced, whereby the superabsorbent polymers are dehydrated and the particle diameter is decreased. As a result, the handling of the pulp fibers which include superabsorbent polymers at each of the subsequent processes becomes easier and the treatment efficiency is improved. The reason why the acidic aqueous solution (an aqueous solution of inorganic acid or organic acid) is used as the inactivation aqueous solution is that, in comparison with an aqueous solution of lime or calcium chloride, ash content is less likely to remain in the pulp fibers, and further, it is easier to adjust the degree of inactivation (the particle diameter and the degree of specific gravity) by pH. As the pH of the acidic aqueous solution, 1.0 or higher and 4.0 or lower is preferable, and 1.2 or higher and 2.5 or lower is more preferable. When the pH is too high, the absorption performance of the superabsorbent polymers cannot be sufficiently lowered, and the sterilization performance may be lowered. When the pH is too low, there is a risk of corrosion in the equipment, and a large amount of alkaline chemicals are to be required for neutralization treatment during wastewater treatment. Especially, in order to separate the pulp fibers and the superabsorbent polymers from the other materials, it is preferable that the size and the specific gravity of the pulp fibers and those of the superabsorbent polymers are relatively similar to each other. Accordingly, by setting the pH of the acidic aqueous solution to 1.0 or higher and 4.0 or lower, the superabsorbent polymers can be made to be even smaller by the inactivation, whereby the size and the specific gravity of the pulp fibers and those of the superabsorbent polymers can be made to be relatively similar to each other. As the organic acid, for example, citric acid, tartaric acid, gluconic acid, glycolic acid, malic acid, etc., may be mentioned, and hydroxycarbonate-based organic acid such as citric acid, etc., is especially preferable. By the chelating effect of citric acid, metal ions, etc., in the excrement can be trapped and removed, and further, by the washing effect of citric acid, high level of dirt removal effect can be expected. On the other hand, as the inorganic acid, for example, sulfuric acid, hydrochloric acid, and nitric acid, may be mentioned, and from the viewpoint of not including chlorine, and the cost, etc., sulfuric acid is preferable. Since pH varies depending on the water temperature, the pH in the present invention is referred to as the pH when measured at an aqueous solution temperature at 20° C. The organic acid concentration of the organic acid aqueous solution is not particularly limited, and in a case in which the organic acid is citric acid, 0.5 mass % or higher and 4 mass % or lower is preferable. The inorganic acid concentration of the inorganic acid aqueous solution is not particularly limited, and in a case in which the inorganic acid is sulfuric acid, 0.1 mass % or higher and 0.5 mass % or lower is preferable. The crushing process S12 is performed by the crushing device 12. While the acidic aqueous solution which includes the collection bag in which a hole is punched and is sunk under the water surface of the acidic aqueous solution, that is the mixed solution 91, is being discharged from the solution tank, the used absorbent articles inside the collection bag are crushed together with the collection bag within the acidic aqueous solution. Further, the acidic aqueous solution (the mixed solution 92) which includes the crushed matter obtained by the crushing portion is withdrawn from the crushing portion by the pump, and is delivered to the subsequent process.

The crushing process S12, preferably crushes the used absorbent articles together with the collection bag so that the average value of the size of the crushed matter is 5 cm or larger and 10 cm or smaller. As the absorbent article, a length of approximately 15 cm to 100 cm and a width of 10 cm to 100 cm is assumed. By crushing the crushed matter so that the average value of the size of the crushed matter is to be 5 cm or larger and 10 cm or smaller, a slit can be reliably provided in the back sheet and/or the top sheet of each of the used absorbent articles. Accordingly, substantially all pulp fibers can be extracted from the slit in each of the used absorbent articles, whereby the recovery rate of the pulp fibers (the total amount of pulp fibers to be regenerated/the total amount of pulp fibers in the supplied used absorbent articles) can be improved. When the average value of the size is set to less than 5 cm, materials other than the pulp fibers (for example: films (such as the material of the collection bag, the back sheet, etc.), nonwoven fabric (such as the top sheet, etc.), elastic bodies (such as rubbers for leakage prevention walls)) are cut into too small sizes, whereby it is difficult for such materials to be separated from the pulp fibers in the subsequent processes, and the recovery rate of the pulp fibers is to be reduced. On the other hand, when the average value of the size is set to be larger than 10 cm, it is difficult to apply a slit in the used absorbent articles, and the recovery rate of the pulp fibers is to be reduced.

The first separation process S13 is performed by the first separation device 13. The mixed solution 92 which includes the crushed matter and the acidic aqueous solution obtained by the crushing device 12 is stirred, and while the washing to remove dirt from the crushed matter is performed, the mixed solution 92 is separated into the pulp fibers, the superabsorbent polymers and the acidic aqueous solution, and other materials. As a result, the pulp fibers, the superabsorbent polymers and the acidic aqueous solution (partially including the other materials, etc.) among the mixed solution 92 are separated by passing through the penetration hole, so as to be delivered from the first separation device 13 (the mixed solution 93). The other materials except the pulp fibers, the superabsorbent polymers and the acidic aqueous solution among the mixed solution 92 cannot pass through the penetration hole, and remain inside the first separation device 13 or is delivered through another route.

The present method (the system) includes, in the crushing process which crushes the used absorbent articles (the hole punching process S11 (the rupturing device 11) to the first separation process S13 (the first separation device 13)), at least the hole punching process S11 (the rupturing device 11) and the crushing process S12 (the crushing device 12). Accordingly, the used absorbent articles in a state of being placed in the collection bag are crushed together with the collection bag within the inactivation aqueous solution, whereby dirt and fungi are hardly mixed into the inactivation aqueous solution and odor is hardly produced at least until the initiation of the crushing. Further, even if dirt and fungi are mixed into the inactivation aqueous solution and odor is produced when the used absorbent articles are crushed, at almost the same time as the crushing, the inactivation aqueous solution into which the dirt and fungi are mixed is delivered from the solution tank together with the crushed matter, whereby the inactivation aqueous solution can be washed away with the dirt and fungi hardly remaining in the solution tank. In addition, since odor can be sealed by the inactivation aqueous solution, the production of odor can also be suppressed to a lower degree. Accordingly, when crushing used absorbent articles, dirt and fungi can be suppressed from being scattered and odor can be suppressed from being released.

Incidentally, the used absorbent articles may not be crushed together with the collection bag within the inactivation aqueous solution and may be crushed together with the collection bag within gas (for example: air). In such a case, the hole punching process S11 is not necessary, and the crushing process S12 performs the crushing in the air in a state in which the inactivation aqueous solution is not present. Thereafter, the inactivation aqueous solution is supplied to the first separation process S13 together with the crushed matter of the crushing process S12.

The first dust removal process S14 is performed by the first dust removal device 14. While the acidic aqueous solution which includes the pulp fibers and the superabsorbent polymers delivered from the first separation device 13, that is, the mixed solution 93 maintains pH within the predetermined range, the mixed solution 93 is separated into the acidic aqueous solution which includes the pulp fibers and the superabsorbent polymers and the other materials by a screen. As a result, the pulp fibers, the superabsorbent polymers and the acidic aqueous solution (partially including the other materials, etc.) among the mixed solution 93 are separated by passing through the screen, and are delivered from the first dust removal device 14 (the mixed solution 94). The other materials except the pulp fibers, the superabsorbent polymers and the acidic aqueous solution among the mixed solution 93 cannot pass through the screen, and remain inside the first dust removal device 14 or are delivered through another route. As the concentration of the total of the pulp fibers and the superabsorbent polymers within the acidic solution, for example, 0.1 mass % or more and 10 mass % or smaller may be mentioned, and the same is preferably 0.1 mass % or more and 5 mass % or smaller. Further, the ratio of the pulp fibers to the superabsorbent polymers within the acidic solution is, for example, 50 to 90 mass %:50 to 10 mass %.

Incidentally, it is preferable that the acidic aqueous solution is adjusted with pH at least until the first dust removal process S14, so that the differences between the specific gravity and the size of the superabsorbent polymers and the specific gravity and the size of the pulp fibers are within a predetermined range, and the pH is maintained until the third separation process S18. The predetermined range is, for example, a range in which one is within 0.2 to 5 times as much as the other. In such a case, the processes before the first dust removal process S14 can be regarded as an inactivation process of inactivating the superabsorbent polymers by mixing the acidic aqueous solution which is adjusted with pH so that the differences between the specific gravity and the size of the superabsorbent polymers and the specific gravity and the size of the pulp fibers are within a predetermined range, the pulp fibers and the superabsorbent polymers.

The second dust removal process S15 is performed by the second dust removal device 15. While the acidic aqueous solution which includes the pulp fibers and the superabsorbent polymers delivered from the first dust removal device 14, that is, the mixed solution 94 maintains pH within the predetermined range, the mixed solution 94 is separated into the acidic aqueous solution which includes the pulp fibers and the superabsorbent polymers and the other materials by a screen. As a result, the pulp fibers, the superabsorbent polymers and the acidic aqueous solution (partially including the other materials, etc.) among the mixed solution 94 are separated by passing through the screen, and are delivered from the second dust removal device 15 (the mixed solution 95). The other materials except the pulp fibers, the superabsorbent polymers and the acidic aqueous solution among the mixed solution 94 cannot pass through the screen, and remain inside the second dust removal device 15 or is delivered through another route.

The third dust removal process S16 is performed by the third dust removal device 16. While the acidic aqueous solution which includes the pulp fibers and the superabsorbent polymers delivered from the second dust removal device 15, that is, the mixed solution 95 maintains pH within the predetermined range, the mixed solution 95 is subjected to a centrifugal separation by a conical housing placed in an up-side down manner and is separated into the pulp fibers and the superabsorbent polymers within the acidic aqueous solution and the other materials (the foreign matter with a larger weight). As a result, the pulp fibers, the superabsorbent polymers and the acidic aqueous solution among the mixed solution 95 are delivered from the upper portion of the third dust removal device 16 (a cyclone separating machine) (the mixed solution 96). On the other hand, the other materials with a large specific gravity except the pulp fibers, the superabsorbent polymers and the acidic aqueous solution among the mixed solution 95, such as metal, are delivered from the lower portion of third dust removal device 16 (a cyclone separating machine).

The present method (the system) includes, in the dust removal process of removing foreign matter (other materials) (the first dust removal process S14 (the first dust removal device 14) to the third dust removal process S16 (the third dust removal device 16)), at least the second dust removal process S15 (the second dust removal device 15) and the third dust removal process S16 (the third dust removal device 16). Accordingly, the pulp fibers and superabsorbent polymers can be easily separated by the size from mainly the resin materials among the other materials of the used absorbent articles except the pulp fibers and superabsorbent polymers (the second dust removal process S15 (the second dust removal device 15)), and can be easily separated by the specific gravity from materials with a large specific gravity among the other materials, such as metal materials (the third dust removal process S16 (the third dust removal device 16)). Further, thereafter, the pulp fibers and the superabsorbent polymers are separated from each other (the second and the third separation processes S17, S18 (the second and the third separation devices 17, 18), whereby the pulp fibers and the superabsorbent polymers can be easily recovered from the used absorbent articles. At this time, the number of processes of separating the pulp fibers and superabsorbent polymers, and the other materials can be reduced, whereby the treatment efficiency can be improved.

Subsequently, the second separation process S17 is performed by the second separation device 17. The acidic aqueous solution which includes the pulp fibers and the superabsorbent polymers delivered from the third dust removal device 16, that is, the mixed solution 96, is separated into the pulp fibers within the acidic aqueous solution and the superabsorbent polymers within the acidic aqueous solution by a drum screen. As a result, the acidic aqueous solution which includes the superabsorbent polymers is separated from the mixed solution 96 by passing through the drum screen and is delivered from the second separation device 17. The acidic aqueous solution which includes the pulp fibers among the mixed solution 96 cannot pass through the drum screen, and is delivered from the second separation device 17 through another route (the mixed solution 97). The superabsorbent polymers can be separated from the separated superabsorbent polymers and the acidic aqueous solution by a screen separating machine, etc., whereby the superabsorbent polymers can be recovered.

The third separation process S18 is performed by the third separation device 18. The pulp fibers which include remaining superabsorbent polymers which could not be separated and the acidic aqueous solution delivered from the second separation device 17, that is the mixed solution 97, is separated into a solid which includes the pulp fibers and the superabsorbent polymers which could not be separated, that is, the mixed matter 98, and a liquid which includes the superabsorbent polymers and the acidic aqueous solution by a drum screen. Further, together with the separation, the superabsorbent polymers within the solid are applied with pressure and are crushed. As a result, the acidic aqueous solution which includes the superabsorbent polymers is separated from the mixed solution 97 by passing through the drum screen and is delivered from the third separation device 18. The pulp fibers in which the superabsorbent polymers are crushed among the mixed solution 97 cannot pass through the drum screen, and are delivered to the outside of the third separation device 18 from the gap of the lid body at the tip portion of the drum screen (the mixed matter 98).

The hole punching process S11 to the third separation process S18 can be regarded as the processes of preparing the mixed matter 98 of the pulp fibers and superabsorbent polymers separated from the used absorbent articles. The processes of preparing the mixed matter 98 of the pulp fibers and superabsorbent polymers separated from the used absorbent articles are not limited to each of the above-mentioned processes, and may be other processes as long as the mixed matter of the pulp fibers and superabsorbent polymers which derives from the used absorbent articles can be obtained.

The oxidizing agent treatment process S19 is performed by the oxidizing agent treatment device 19. The pulp fibers and the crushed superabsorbent polymers in the solid delivered from the third separation device 18 (the mixed matter 98) are treated by an aqueous solution which includes an oxidizing agent. Accordingly, the superabsorbent polymers are subjected to an oxidative decomposition so as to be removed from the pulp fibers. As a result, the superabsorbent polymers which have been attached to the pulp fibers in the mixed matter 98 (for example: which have been remained on the surface of the pulp fibers) are subjected to the oxidative decomposition by an aqueous solution (the treatment solution) which includes an oxidizing agent (for example: ozone), and change into an organic matter with low molecular weight which is soluble in an aqueous solution, whereby are removed from the pulp fibers. The state in which the superabsorbent polymers are subjected to an oxidative decomposition and are changed into an organic matter with low molecular weight which is soluble in an aqueous solution is referred to a state in which the superabsorbent polymers pass through a screen of 2 mm. Accordingly, impurities such as the superabsorbent polymers, etc., included in the pulp fibers are removed, pulp fibers with high purity can be produced, and sterilization, bleaching, and deodorization of the pulp fibers can be performed by the oxidizing agent treatment. In the present embodiment, ozone is used as the oxidizing agent.

For example, the oxidizing agent treatment device 19 shown in FIG. 2 performs, as the oxidizing agent treatment process S19, the pretreatment supply process S19-1*a*, the pretreatment process S19-1*b*, and the pretreatment solution transfer process S19-1*c*, in the pretreatment device 19-1, and further performs the supply process S19-2*a* and the treatment process S19-2*b*, in the treatment device 19-2.

The pretreatment supply process S19-1*a* supplies the mixed matter 98 the inside of the pretreatment solution P1 within the pretreatment tank 101.

The pretreatment process S19-1*b* reduces the superabsorbent polymers of the mixed matter 98 by, inside the pretreatment tank 101, emitting the gaseous substance Z1 by the gaseous substance emission portion 102*a* within the pretreatment tank 101, from below the mixed matter, toward the mixed matter 98 which is present inside the pretreatment solution P1 separate from the bottom portion of the pretreatment tank 101.

The pretreatment solution transfer process S19-1*c* extracts at least a portion of the pretreatment solution P1 which includes the mixed matter 98 in which the superabsorbent polymers have been reduced in the pretreatment process S19-1*b* from the lower portion of the pretreatment tank 101, so as to transfer the extracted pretreatment solution P1 from the upper portion of the pretreatment tank 101 to the treatment solution P2.

The specific configurations are as follows.

In the pretreatment supply process S19-1*a*, the mixed matter 98 which includes the pulp fibers (in which the superabsorbent polymers remain) separated by the third separation process S18 is added with water, so as to be an aqueous solution. The aqueous solution is supplied to the inside of the pretreatment solution P1 from the supply port 101*a* at the upper portion of the pretreatment tank 101 by the pump 121 through the pipes 131, 132 (V1 opened, and V2 closed).

Subsequently, in the pretreatment process S19-1*b*, the pretreatment solution P1 is an acidic aqueous solution (for the purpose of suppressing the deactivation of ozone, and of inactivating the superabsorbent polymers), and the specific gravity thereof is approximately 1. Accordingly, the pulp fibers sink from the upper portion of the pretreatment solution P1 toward the lower portion. On the other hand, the gaseous substance Z1 which includes ozone generated by the gaseous substance generation portion 102*b* is emitted from the gaseous substance emission portion 102*a* to the pretreatment tank 101 through the pipe 133. The gaseous substance Z1 is emitted continuously from the vicinity of the lower portion of the pretreatment tank 101 to the inside of the pretreatment solution P1 in a state of fine bubbles (for example: microbubbles or nanobubbles), and rises from the lower portion of the pretreatment solution P1 toward the upper portion. Subsequently, inside the pretreatment solution P1, the pulp fibers which sink from the upper portion to the lower portion and the gaseous substance Z1 which rises from the lower portion to the upper portion collide while traveling with facing each other. Further, the gaseous substance Z1 is attached to the surface of the pulp fibers so as to wrap the pulp fibers. At this time, the ozone in the gaseous substance Z1 reacts with the superabsorbent polymers in the pulp fibers, performs oxidative decomposition for the superabsorbent polymers, and makes the superabsorbent polymers dissolve in the pretreatment solution P1. Since there is countercurrent, the contacting probability of the superabsorbent polymers included in the pulp fibers and the gaseous substance Z1 can be greater. Accordingly, the superabsorbent polymers in the pulp fibers are lowered, and the viscosity of the pulp fibers which include the superabsorbent polymers are lowered. Therefore, in the treatment process S19-2b at the later stage, the ejector 107 can be prevented from being clogged by the pulp fibers which include the superabsorbent polymers.

Subsequently, in the pretreatment solution transfer process S19-1c, at least a portion of the pretreatment solution P1 which includes the mixed matter 98 in which the superabsorbent polymers are reduced in the pretreatment process S19-1b is withdrawn from the delivery port 101c at the lower portion of the pretreatment tank 101 through the pipe 135 by the pump 122, so that the withdrawn pretreatment solution P1 is supplied from the supply port 105a at the upper portion of the treatment tank 105 to the inside of the treatment solution P2. Incidentally, the ozone of the gaseous substance Z1 which includes ozone accumulated in the upper portion of the pretreatment tank 101 is decomposed, detoxified, and released to the outside by the gaseous substance decomposition device 103.

It should be noted that the pretreatment supply process S19-1a may include a process of extracting at least a portion of the pretreatment solution P1 which includes the mixed matter, from the lower portion of the pretreatment tank 101, so as to transfer the extracted pretreatment solution P1 from the upper portion of the treatment tank 101 to the pretreatment solution P1. To be specific, at least a portion of the pretreatment solution P1 which includes the mixed matter is withdrawn from the delivery port 101b at the lower portion of the pretreatment tank 101 through the pipes 131, 132 (V1 closed, and V2 opened) by the pump 121, and the withdrawn pretreatment solution P1 is supplied from the supply port 101a at the upper portion of the pretreatment tank 101 to the inside of the pretreatment solution P1.

The supply process S19-2a supplies the gaseous substance Z2 to the suction fluid supply port AI of the ejector 107, while supplying the aqueous solution which includes the mixed matter 98 to the drive fluid supply port DI of the ejector 107.

The treatment process S19-2b discharges the mixed solution 98L in which the aqueous solution and the gaseous substance Z2 are mixed inside the ejector 107 from the mixed fluid discharge port CO of the ejector 107 which is connected to the lower portion of the treatment tank 105 to the inside of the treatment solution P2 within the treatment tank 105, so as to reduce the superabsorbent polymers within the mixed matter 98.

The specific configurations are as follows.

In the pretreatment solution transfer process S19-1c, at least a portion of the pretreatment solution P1 which includes the mixed matter 98 in which the superabsorbent polymers are reduced is supplied to the inside of the treatment solution P2 of the treatment tank 105, and while the mixed matter 98 sinks to the treatment solution P2, the mixed matter 98 is included in the treatment solution P2. The treatment solution P2 is an acidic aqueous solution (for the purpose of suppressing the deactivation of ozone, and of inactivating the superabsorbent polymers), and the specific gravity thereof is approximately 1.

In the supply process S19-2a, at least a portion of the treatment solution P2 which includes the mixed matter 98 is withdrawn from the lower portion of the treatment tank 105, and the withdrawn treatment solution P2 is supplied to the drive fluid supply port DI as an aqueous solution. That is, at least a portion of the treatment solution P2 which includes the pretreatment solution P1 which includes the mixed matter 98 is withdrawn from the delivery port 105b at the lower portion of the treatment tank 105 by the pump 123 through the pipe 136, and the withdrawn treatment solution P2 is supplied to the drive fluid supply port DI of the ejector 107 as an aqueous solution. Further, the gaseous substance Z2 which includes ozone generated by the gaseous substance supply device 106 is supplied to the suction fluid supply port AI of the ejector 107 through the pipe 137.

Subsequently, in the treatment process S19-2b, the mixed solution 98L which is generated by the treatment solution P2 which includes the mixed matter 98 and the gaseous substance Z2 being mixed at the ejector 107 is discharged from the mixed fluid discharge port CO to the treatment solution P2 inside the treatment tank 105. At this time, the treatment solution P2 which includes the mixed matter 98 and the gaseous substance Z2 are mixed at an extremely narrow region inside the ejector 107, whereby the mixed solution 98L in which the mixed matter 98 of the pulp fibers and superabsorbent polymers and the gaseous substance Z2 are brought to extremely close contact with each other can be formed. Further, the mixed solution 98L is discharged to the inside of the treatment solution P2 within the treatment tank 105, whereby the treatment solution P2 can be stirred. Still further, when the gaseous substance Z2 is discharged to the treatment solution P2, the gaseous substance Z2 is continuously discharged in a state of fine bubbles (for example: microbubbles or nanobubbles), whereby the gaseous substance Z2 can be diffused extremely widely inside the treatment solution P2. Accordingly, the contacting probability of the superabsorbent polymers included in the pulp fibers inside the treatment tank 105, and ozone which is included in the gaseous substance Z2 can be extremely greater. Therefore, the superabsorbent polymers in the pulp fibers can be removed.

Thereafter, at least a portion of the treatment solution P2 which includes the pulp fibers in which the superabsorbent polymers have been removed in the treatment process S19-2b is withdrawn from the delivery portion 105d at the lower portion of the treatment tank 105 through the pipe 139 by the pump 124, and the withdrawn treatment solution P2 is transferred to the equipment at the later stage as the mixed solution 99. Incidentally, the ozone of the gaseous substance Z2 which includes ozone accumulated in the upper portion of the treatment tank 105 is decomposed, detoxified, and released to the outside by the gaseous substance decomposition device 108.

In a case in which the gaseous substances Z1, Z2 which include ozone are supplied to the pretreatment solution P1, and the treatment solution P2, respectively, as the ozone concentration within the pretreatment solution P1 and the treatment solution P2, for example, 1 to 50 mass ppm may be mentioned. As the ozone concentration within the gaseous substances Z1 and Z2, for example, 40 to 200 g/cm³ may be mentioned. As the concentration of the pulp fibers (which include the superabsorbent polymers) within gaseous substances Z1 and Z2, for example, 0.1 to 20 mass % may be mentioned. As the time during which the pulp fibers are present within the pretreatment tank 101 and the treatment tank 105, for example, 2 to 60 minutes may be mentioned. The gaseous substances Z1, Z2 are preferably microbubbles or nanobubbles, and are supplied to the inside of the pretreatment solution P1 and the treatment solution P2. The bubbles of microbubbles have a diameter of approximately 1 to 1000 μm, and the bubbles of nanobubbles have a diameter of approximately 100 to 1000 nm. The microbubbles or nanobubbles are fine bubbles, have a large surface area per unit volume, and the rising speed in solution is slow, whereby the probability of the bubbles coming into contact with the pulp fibers can be increased, and the bubbles can come into contact with the surfaces of a large amount of pulp fibers. Accordingly, the pulp fibers can be wrapped evenly by the fine bubbles, and the contacting area of the pulp fibers and the gaseous substance can be further increased. Further, by the buoyant force of the bubbles, the sinking speed of the pulp fibers which include the superabsorbent polymers can be lowered, and the contacting time of the pulp fibers and the gaseous substance can be further increased. Accordingly, the superabsorbent polymers which are included in the pulp fibers can be subjected to the oxidative decomposition more reliably so as to be removed from the pulp fibers.

It should be noted that in a case in which the oxidizing agent is ozone, by using an acidic aqueous solution as the treatment solution, the deactivation of ozone can be suppressed, and the effects of ozone (the oxidative decomposition of the superabsorbent polymers, sterilization, bleaching, deodorization) can be improved. In addition to the inactivation of the superabsorbent polymers, in a case in which the acidic aqueous solution is used in the crushing process and in the dust removal processes, since there is a continuity between each of the processes, there is no risk that any inconvenience occurs by the aqueous solution in each of the processes being different, whereby the treatment can be performed stably and reliably. Still further, from the viewpoint of reducing influence to the workers and to the device by acid, an organic acid among the acidic aqueous solution is preferable, and among the organic acid, citric acid is preferable from the viewpoint of removing metal.

The fourth separation process S20 is performed by the fourth separation device 20, and the treatment solution which includes the pulp fibers that have been treated by the oxidizing agent treatment device 19, that is, the mixed solution 99, passes through a screen with a plurality of openings, whereby the pulp fibers and the treatment solution are separated from the mixed solution 99. As a result, the treatment solution 104 passes through a screen which includes a plurality of openings so as to be separated from the mixed solution 99 into the pulp fibers and the treatment solution. As a result, the treatment solution P2 passes through a screen so as to be separated from the mixed solution 99, and is delivered from the fourth separation device 20. The separated treatment solution P2, that is, the oxidizing agent treatment solution, may be returned to the oxidizing agent treatment device 19 and may be reused. Accordingly, the cost of the oxidizing agent treatment solution can be reduced. On the other hand, the pulp fibers among the mixed solution 99 cannot pass through the screen and remain in the fourth separation device 20 or is delivered through another route. The aforementioned processes can be regarded as a process of recovering the pulp fibers, and thus a process of manufacturing recycled pulp fibers.

Note that the specific gravity of the superabsorbent polymers was measured by the specific gravity bottle method of the measurement method of the density and the specific gravity of chemical products according to JIS K 0061.

On the other hand, since the actual measurement of the size of the superabsorbent polymers (after absorption) was difficult, it was assumed that the superabsorbent polymers were spheres, and the size (the diameter) thereof was calculated as follows. That is, the average diameter of the superabsorbent polymers before absorption was assumed to be 200 μm, and the size (the diameter) of the superabsorbent polymers after absorption was estimated by a volume expansion calculation based on the water amount of the aqueous solution absorbed by the superabsorbent polymers. The volume expansion calculation was performed in the following manner. First, the amount of water absorbed by the superabsorbent polymers (per 1 particle) was measured. Next, it was assumed that the volume of water which corresponds to such water amount is the volume V of the superabsorbent polymers after absorption, and based on $V=4/3\pi r^3$, the radius r of the superabsorbent polymers after absorption was obtained. Further, the diameter which is twice the radius r is regarded as the size of the superabsorbent polymers (after absorption).

Note that the proportion of the pulp fibers and the superabsorbent polymers in the acidic aqueous solution was measured in the following manner. First, a portion of the acidic aqueous solution was taken as a sample, the sample is put into in a filter of 200 mesh and the sample weight W0 was measured. Next, the sample on the filter is hung for 5 minutes to be drained, is subjected to an absolute drying by a predetermined absolute drying method (a method of heating and drying a sample at 120° C. for 10 minutes), and the absolute dry weight W1 of the obtained absolutely dried matter was measured. Next, the absolutely dried matter was immersed in an aqueous solution which includes ozone, the obtained matter is absolutely dried by the above-mentioned absolute drying method, and the absolute dry weight W2 as the pulp fibers was measured. Further, the weight obtained by subtracting the absolute dry weight W2 from the absolute dry weight W1 was regarded as the weight of the superabsorbent polymers, and the proportion of the pulp fibers and the superabsorbent polymers in the acidic aqueous solution was calculated by the following formula. That is, (the proportion of the pulp fibers)=(the absolute dry weight W2)/(the sample weight W0), and (the proportion of the superabsorbent polymers)=(the absolute dry weight W1−the absolute dry weight W2)/(the sample weight W0). From the viewpoint of weight proportion, the solid weight of dirt is extremely small, thus can be ignored.

Note that the ozone concentration within the aqueous solution was measured by the following manner. First, 85 mL of an aqueous solution in which ozone was dissolved is put into 100 mL graduated cylinder in which approximately 0.15 g of potassium iodide and 5 mL of 10% citric acid solution were placed. After the reaction, the same was transferred to 200 mL Erlenmeyer flask. A starch solution was added therein so that the color was changed to purple, and thereafter, the titration was performed with 0.01 mol/L sodium thiosulfate while stirring until the solution became colorless. By using the following formula based on the titration value, the ozone concentration within the aqueous solution was calculated. The ozone concentration within the aqueous solution (mass ppm)=0.01 mol/L sodium thiosulfate (mL) required for the titration×0.24×0.85 (mL).

This method preferably includes the ozone treatment process S22 and the pH adjustment process S23. These processes are for the purpose of regenerating and reusing the acidic aqueous solution which is used in this method, and the cost of the acidic aqueous solution can be reduced. The ozone treatment process S22 separates the acidic aqueous solution from the superabsorbent polymers and the acidic aqueous solution which have been separated by the second separation process S17, and performs the sterilization treatment for the separated acidic aqueous solution by an ozone containing aqueous solution. The pH adjustment process S23 adjusts pH of the acidic aqueous solution which has been performed with the sterilization treatment, so as to produce the regenerated acidic aqueous solution. The regenerated acidic aqueous solution is supplied to the rupturing device 11, or alternatively, in a case in which the crushing is performed without using an inactivation aqueous solution in the crushing process S12, the regenerated acidic aqueous solution is supplied to the first separation process S13. The surplus of the acidic aqueous solution is stored in the water storage tank 24.

The present method (system) includes, in the recovery processes of recovering pulp fibers, etc. (the second separation process S17 (the second separation device 17) to the fourth separation process S20 (the fourth separation device 20)), at least the oxidizing agent treatment process S19 (the oxidizing agent treatment device 19). Further, the oxidizing agent treatment process S19 (the oxidizing agent treatment device 19) includes at least the supply process S19-2a and the treatment process S19-2b (the treatment device 19-2). In the supply process S19-2a and the treatment process S19-2b (the treatment device 19-2), the aqueous solution (which includes the mixed matter 98 which includes the superabsorbent polymers and pulp fibers) which is a drive fluid, and the gaseous substance Z2 which is a suction fluid are supplied to the ejector 107, so as to be mixed inside the ejector 107, whereby the mixed solution 98L which is a mixed fluid in which the aqueous solution and the gaseous substance Z2 are well mixed can be formed efficiently. At this time, the mixed matter 98 of the pulp fibers and superabsorbent polymers and the gaseous substance Z2 can be made to be in an extremely close contact with each other. Further, the mixed solution 98L is discharged into the treatment solution P2 inside the treatment tank 105, whereby the treatment solution P2 can be stirred. Still further, when the gaseous substance Z2 is discharged into the treatment solution P2, the gaseous substance Z2 is discharged in a continuous manner in a state of fine bubbles, whereby can be diffused extremely widely inside the treatment solution P2. Accordingly, the reaction of the superabsorbent polymers and the gaseous substance Z2 can be made to proceed extremely efficiently not only for the pulp fibers which include the superabsorbent polymers inside the mixed solution 98L to be discharged from the ejector 107 but also for the pulp fibers which include the superabsorbent polymers within the treatment solution inside the treatment tank 105. Further, the superabsorbent polymers within the mixed matter 98 are oxidatively decomposed in a suitable manner so as to dissolve into the treatment solution P2 and to be removed, and further, the unevenness in the treatment of pulp fibers can be suppressed. Accordingly, the purity of the regenerated pulp fibers, that is, the recycled pulp fibers can be improved, and recycled pulp fibers which can be reused easily can be manufactured. Therefore, it becomes possible to manufacture the recycled pulp fibers efficiently while suitably removing the superabsorbent polymers from the pulp fibers.

As mentioned above, in the supply process S19-2a and the treatment process S19-2b (the treatment device 19-2), the close contact of the pulp fibers to which the superabsorbent polymers and the gaseous substance, the stirring of the treatment solution by the mixed solution 98L, and the wide diffusion of the bubbles, etc., function effectively for the removal of the superabsorbent polymers. Accordingly, in comparison to the pretreatment process S19-1b (the pretreatment device 19-1), the treatment process S19-2b (the treatment device 19-2) has a higher treatment efficiency. It should be noted however that when the amount of the superabsorbent polymers attached to the pulp fibers is large, it is conceivable that the viscosity of the mixed matter 98 is relatively high by the superabsorbent polymers. In such a case, when the aqueous solution which includes the mixed matter 98 to be supplied to the oxidizing agent treatment process S19 (the oxidizing agent treatment device 19) is supplied directly to the treatment device 19-2, it is conceivable that the ejector 107 is clogged by the mixed matter 98. Accordingly, in order to deal with such an issue, in the present embodiment, before the supply process S19-2a and the treatment process S19-2b (the treatment device 19-2), the superabsorbent polymers which are attached to the pulp fibers in the mixed matter 98 are reduced by the pretreatment process S19-1b (the pretreatment device 19-1). To be specific, the mixed matter 98 within the aqueous solution supplied to the drive fluid supply port DI in the supply process S19-2a is made to come into contact with the gaseous substance for pretreatment Z1 (for example: ozone gas) in the pretreatment process S19-1b, before the supply process S19-2a. Accordingly, before the supply process S19-2a, the superabsorbent polymers are oxidatively decomposed to some extent so as to dissolve into the pretreatment solution P1 and to be removed. That is, in the pretreatment process S19-1b, the superabsorbent polymers within the mixed matter 98 can be reduced to some extent. Further, in the present embodiment, a portion of the pretreatment solution P1 after the pretreatment process S19-1b is transferred to the treatment solution P2, whereby the superabsorbent polymers within the mixed matter 98 can be reduced also in the treatment solution P2, before the mixed matter 98 is supplied to the drive fluid supply port DI of the ejector 107. Accordingly, in the treatment process S19-2b, the ejector 107 can be suppressed from being clogged with the mixed matter 98 within the aqueous solution, that is, the pulp fibers and superabsorbent polymers. Therefore, even when the amount of the mixed matter 98 within the aqueous solution is increased, the mixed solution 98L of the mixed matter 98 and the gaseous substance Z2 is formed so as to be stably discharged into the treatment tank 105. Thus, it is possible to increase the mixed matter 98 within the aqueous solution which can be treated by the treatment process S19-2b and to manufacture the recycled pulp fibers more efficiently. Further, the superabsorbent polymers which are to be removed by the treatment process S19-2b are reduced, whereby the unevenness in the treatment of pulp fibers can be suppressed in a greater degree. Accordingly, the purity of the regenerated pulp fibers, that is, the recycled pulp fibers can be improved, and recycled pulp fibers which can be reused easily can be manufactured. Therefore, it becomes possible to manufacture the recycled pulp fibers more efficiently while more suitably removing the superabsorbent polymers from the pulp fibers.

Figure 4:
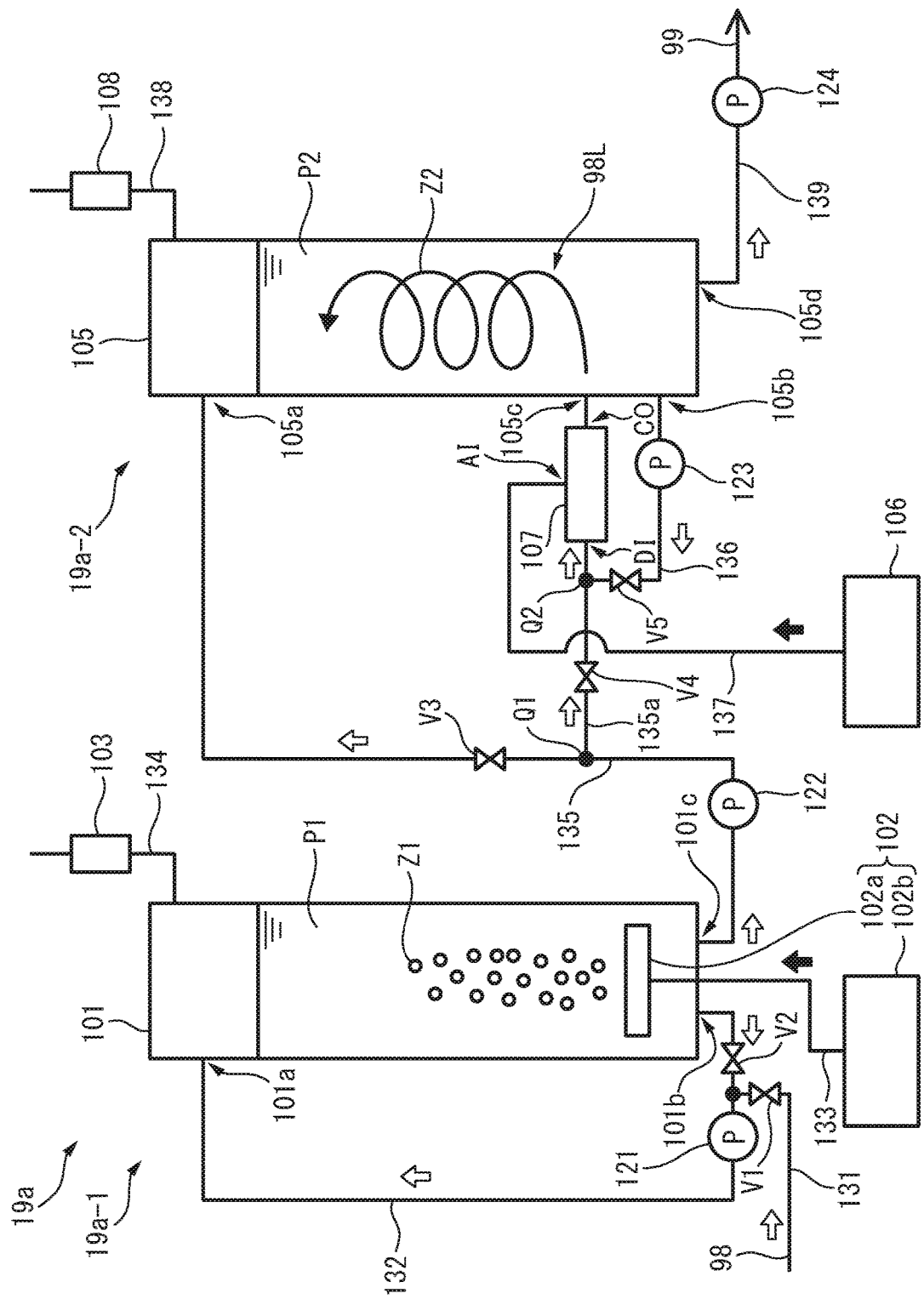
FIG. 4 is a schematic diagram showing a configuration example of an oxidizing agent treatment device according to a second embodiment.

It should be noted that in a case in which the viscosity of the mixed matter 98 to be supplied to the oxidizing agent treatment process S19 (the oxidizing agent treatment device 19) is low, or the concentration of the mixed matter 98 within the aqueous solution is low, etc., it is not necessary to reduce the superabsorbent polymers of the mixed matter 98 by the pretreatment process S19-1b (the pretreatment device 19-1). In such a case, the pretreatment supply process S19-1a and the pretreatment process S19-1b (the pretreatment device 19-1) can be omitted. At this time, the aqueous solution which includes the mixed matter 98 to be supplied to the oxidizing agent treatment device 19 may be supplied to at least one of the drive fluid supply port DI of the ejector 107, and the supply port 105a at the upper portion of the treatment tank 105 of the treatment device 19-2 (refer to the second embodiment (FIG. 4). Even in such a case, the above-mentioned effect of the present embodiment, that is the effect of efficiently manufacturing the recycled pulp fibers can be exhibited. Further, not only the pretreatment supply process S19-1a and the pretreatment process S19-1b (the pretreatment device 19-1) can be omitted and the treatment efficiency can be further improved, but also it is space saving.

Incidentally, even in a case in which the viscosity of the mixed matter 98 to be supplied to the oxidizing agent treatment process S19 (the oxidizing agent treatment device 19) is relatively low, or the concentration of the mixed matter 98 within the aqueous solution is relatively low, in a case in which the amount of the mixed matter 98 to be treated is large, a plurality of ejectors 107 (and the pumps 123 and the pipes 136) may be provided in the treatment tank 105. Even in such a case, the above-mentioned effect of the present embodiment, that is the effect of efficiently manufacturing the recycled pulp fibers can be exhibited, and a larger amount of the mixed matter 98 can be treated, whereby the treatment efficiency can be improved in a greater degree. Further, when a plurality of ejectors 107 are provided in the treatment tank 105, the amount of the mixed matter 98 to be supplied to one ejector 107 can be reduced, whereby in a case in which the viscosity of the mixed matter 98 is high, the pretreatment supply process S19-1a and the pretreatment process S19-1b (the pretreatment device 19-1) can be omitted.

Further, as a preferred aspect of the present embodiment, in the supply process S19-2a, at least a portion of the treatment solution P2 which includes the mixed matter 98 is extracted from the delivery port 105b at the lower portion of the treatment tank 105, and the extracted treatment solution P2 is made to circulate to the upper portion above the lower portion of the treatment tank 105 through the ejector 107. The pulp fibers in the lower portion of the treatment tank 105 are those which once pass through the ejector 107 and are finally sunk to the lower portion while moving upwards of the treatment tank 105 by the swirling flow, or those which are immersed in the treatment solution P2 in which the gaseous substance Z2 are dissolved. Accordingly, such pulp fibers may be regarded as those which have been performed with the treatment process S19-2b at least once. Therefore, in the supply process S19-2a, a portion of the treatment solution P2 is extracted from the lower portion of the treatment tank 105, and the extracted treatment solution P2 is made to circulate to the upper portion of the treatment tank 105 through the ejector 107, whereby the treatment process S19-2b can be substantially performed multiple times. Accordingly, the reaction of the superabsorbent polymers and the gaseous substance Z2 can be made to proceed more reliably. Therefore, the superabsorbent polymers are oxidatively decomposed in a more suitable manner so as to dissolve into the treatment solution P2 and to be removed, and the unevenness in the treatment of pulp fibers can be suppressed in a greater degree.

Further, as a preferred aspect of the present embodiment, in the pretreatment supply process S19-1a, at least a portion of the pretreatment solution P1 is extracted from the delivery port 101b at the lower portion of the pretreatment tank 101, and the extracted pretreatment solution P1 is made to circulate to the supply port 101a at the upper portion of the pretreatment tank 101. The pulp fibers in the lower portion of the pretreatment tank 101 are those which are once suppled from the supply port 101a to the upper portion of the pretreatment tank 101 and are finally sunk to the lower portion, or those which are immersed in the pretreatment solution P1 in which the gaseous substance Z1 are dissolved. Accordingly, such pulp fibers may be regarded as those which have been performed with the pretreatment process S19-1b at least once. Therefore, in the pretreatment supply process S19-1a, a portion of the pretreatment solution P1 is extracted from the lower portion of the pretreatment tank 101, and the extracted pretreatment solution P is made to circulate to the upper portion of the pretreatment tank 101, whereby the pretreatment process S19-1b can be substantially performed multiple times. Accordingly, in the treatment process S19-2b at the later stage, the ejector 107 can be suppressed from being clogged with the mixed matter 98 within the aqueous solution, that is, the pulp fibers and superabsorbent polymers. Therefore, even when the amount of the mixed matter 98 within the aqueous solution is increased in a greater degree, the mixed solution 98L of the mixed matter 98 and the gaseous substance Z2 is formed so as to be more stably discharged into the treatment tank 105. Thus, it is possible to increase in a greater degree the mixed matter 98 within the aqueous solution which can be treated by the treatment process S19-2b and to manufacture the recycled pulp fibers more efficiently. Further, the superabsorbent polymers which are to be removed by the treatment process S19-2b are reduced, whereby the unevenness in the treatment of pulp fibers can be suppressed in a greater degree.

Further, the preferred aspect of the present embodiment further includes, before reducing the superabsorbent polymers in the mixed matter 98, an inactivation process of inactivating an absorption performance of the superabsorbent polymers in the mixed matter 98, by treating the mixed matter 98 by using an aqueous solution which is capable of inactivating the absorption performance of the superabsorbent polymers. For example, at least one of the hole punching process S11 to the third separation process S18 is performed within an acidic aqueous solution as an aqueous solution which is capable of the inactivation, whereby can be regarded as the inactivation process. By including the inactivation process, the absorption performance of the superabsorbent polymers is suppressed, whereby in the acidic agent treatment process at the later stage, the superabsorbent polymers can be oxidatively decomposed by the gaseous substance more easily and in a shorter amount of time. That is, the superabsorbent polymers can be removed from the pulp fibers more reliably. As the aqueous solution which is capable of inactivating the absorption performance of the superabsorbent polymers, for example, an acidic aqueous solution (for example: pH 2.5 or lower), may be mentioned. Since the acidic aqueous solution is highly effective for inactivating the superabsorbent polymers, the absorption performance of the superabsorbent polymers can be suppressed more reliably at the stage of the inactivation process.

Second Embodiment

The method and the apparatus of manufacturing recycled pulp fibers from mixed matter of pulp fibers and superabsorbent polymers which is separated from a used absorbent article, according to the second embodiment is explained. In the present embodiment, the oxidizing agent treatment process S19a and the oxidizing agent treatment device 19a are different from the oxidizing agent treatment process S19 and the oxidizing agent treatment device 19 of the first embodiment. Hereinbelow, the different aspects are mainly explained.

FIG. 4 is a schematic diagram which shows a configuration example of the oxidizing agent treatment device 19a. The oxidizing agent treatment device 19a includes the pretreatment device 19a-1 and the treatment device 19a-2. The basic configuration of the pretreatment device 19a-1 and the treatment device 19a-2 are the same as that of the pretreatment device 19-1 and the treatment device 19-2 of the first embodiment. Note that they are different from each other in that the pipe 135 is branched at the branch point Q1 in the middle thereof, the branched branch pipe 135a joins with the pipe 136 at the junction point Q2, so as to be connected to the drive fluid supply port DI of the ejector 107. Accordingly, the oxidizing agent treatment device 19a may select at least one of the treatment tank 105 and the ejector 107 as the supply destination of the pretreatment solution P1 of the pretreatment tank 101. For example, the oxidizing agent treatment device 19a further includes the valve V3 which is positioned on the downstream side with respect to the branch point Q1 in the middle of the pipe 135, the valve V4 which is positioned in the middle of the branch pipe 135a between the branch point Q1 and the junction point Q2, and the valve V5 which is positioned on the upstream side with respect to the junction point Q2 in the middle of the pipe 136. Further, by opening and closing each of the valve V3, the valve V4, and the valve V5, the supply destination of the pretreatment solution P1 and the treatment of the treatment solution etc., can be selected.

In the oxidizing agent treatment process S19a, with a condition that at least one of the pretreatment solution P1 and the treatment solution P2 is supplied to the drive fluid supply port DI of the ejector 107, for example, the cases of the following (A) to (D) can be conceived, with regard to the opening and closing each of the valves V3, V4, and V5. (A) The valves V3, V4, and V5 are opened, closed, opened, respectively. (B) The valves V3, V4, and V5 are closed, opened, closed, respectively. (C) The valves V3, V4, and V5 are closed, opened, opened, respectively. (D) The valves V3, V4, and V5 are opened, opened, opened, respectively.

In a case of the above-mentioned (A), in the pretreatment solution transfer process S19a-1c, the pretreatment solution P1 (which includes the mixed matter 98 which includes the superabsorbent polymers and pulp fibers) of the pretreatment tank 101 is supplied to the supply port 105a of the treatment tank 105 through the pipe 135. On the other hand, in the supply process S19a-2a, the treatment solution P2 (which includes the mixed matter 98 which includes the superabsorbent polymers and pulp fibers) of the treatment tank 105 is supplied to the drive fluid supply port DI of the ejector 107 through the pipe 136. This case is the same as that in the first embodiment (FIG. 2). Accordingly, the effect similar to the first embodiment can be obtained.

In a case of the above-mentioned (B), in the pretreatment solution transfer process S19a-1c, the pretreatment solution P1 of the pretreatment tank 101 is supplied to the drive fluid supply port DI of the ejector 107 through the pipe 135 and the branch pipe 135a. Accordingly, the pretreatment solution transfer process S19a-1c=the supply process S19a-2a is satisfied. At this time, the treatment solution P2 of the treatment tank 105 is not supplied to the ejector 107. In this case, in comparison to the first embodiment (FIG. 2), that is, the case of (A), the pretreatment solution P1 of the pretreatment tank 101 is supplied to the drive fluid supply port DI of the ejector 107 entirely and directly. Accordingly, the entire pulp fibers pass through the ejector 107, whereby the entire pulp fibers can be made to come into contact with the gaseous substance Z2 at the ejector 107, and the treatment efficiency of removing the superabsorbent polymers can be improved.

In a case of the above-mentioned (C), in the pretreatment solution transfer process S19a-1c, the pretreatment solution P1 of the pretreatment tank 101 is supplied to the drive fluid supply port DI of the ejector 107 through the pipe 135 and the branch pipe 135a. Accordingly, the pretreatment solution transfer process S19a-1c=the supply process S19a-2a is satisfied. Further, in the supply process S19a-2a, the treatment solution P2 (which includes the superabsorbent polymers and pulp fibers) of the treatment tank 105 is supplied to the drive fluid supply port DI of the ejector 107 through the pipe 136. In this case, in comparison to the case of (B), the treatment solution P2 of the treatment tank 105 is further supplied to the drive fluid supply port DI of the ejector 107. Accordingly, at least a portion of the pulp fibers which have once passed through the ejector 107 can be made to further pass through the ejector 107. That is, at least a portion of the pulp fibers can be made to come into contact with the gaseous substance Z2 at the ejector 107 multiple times, and the treatment efficiency of removing the superabsorbent polymers can be further improved.

In a case of the above-mentioned (D), in the pretreatment solution transfer process S19a-1c, the pretreatment solution P1 of the pretreatment tank 101 is supplied to the supply port 105a of the treatment tank 105 through the pipe 135. Accompanied therewith, in the supply process S19a-2a, the pretreatment solution P1 of the pretreatment tank 101 is supplied to the drive fluid supply port DI of the ejector 107 through the pipe 135 and the branch pipe 135a. Still further, in the supply process S19a-2a, the treatment solution P2 (which includes the superabsorbent polymers and pulp fibers) of the treatment tank 105 is supplied to the drive fluid supply port DI of the ejector 107 through the pipe 136. In this case, in comparison to the first embodiment (FIG. 2), that is, the case of (A), a portion of the pretreatment solution P1 of the pretreatment tank 101 is supplied to the drive fluid supply port DI of the ejector 107 directly. Accordingly, a portion of the pulp fibers reliably pass through the ejector 107, whereby a portion of the pulp fibers can be reliably made to come into contact with the gaseous substance Z2 at the ejector 107, and the treatment efficiency of removing the superabsorbent polymers can be improved.

Third Embodiment

The method and the apparatus of manufacturing recycled pulp fibers from mixed matter of pulp fibers and superabsorbent polymers which is separated from a used absorbent article, according to the third embodiment is explained. In the present embodiment, the oxidizing agent treatment process S19b and the oxidizing agent treatment device 19b are different from the oxidizing agent treatment process S19 and the oxidizing agent treatment device 19 of the first embodiment. Hereinbelow, the different aspects are mainly explained.

Figure 5:
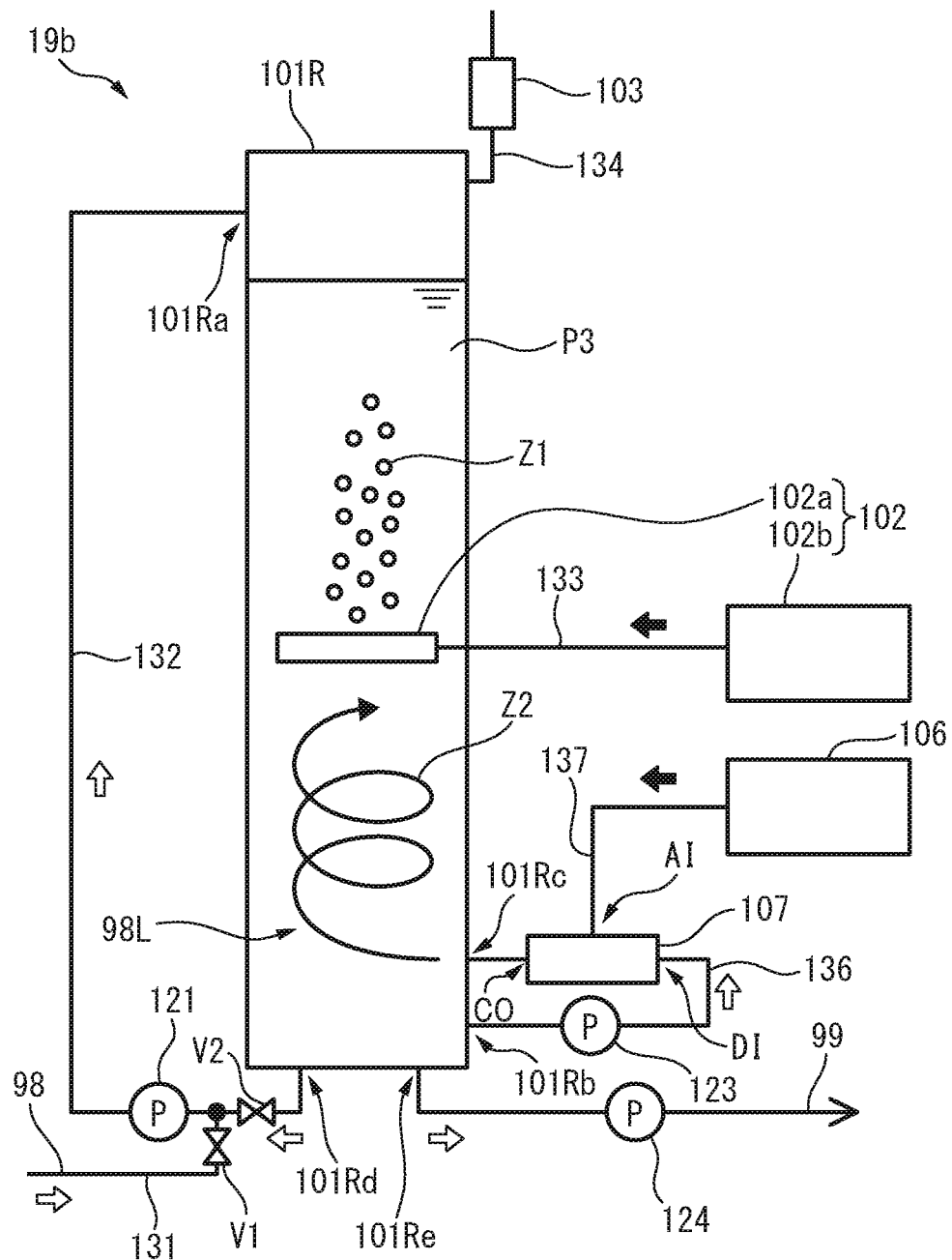
FIG. 5 is a schematic diagram showing a configuration example of an oxidizing agent treatment device according to a third embodiment.

FIG. 5 is a schematic diagram which shows a configuration example of the oxidizing agent treatment device 19b. The oxidizing agent treatment device 19b are different from the oxidizing agent treatment device 19 of the first embodiment in that the pretreatment device and the treatment device are integrally configured. That is, the pretreatment tank and the treatment tank are the same tank 101R. The pretreatment solution and the treatment solution are the same solution P3. The mixed fluid discharge port CO of the ejector 107 is positioned at a lower portion of the tank 101R than the gaseous substance emission portion 102a. The pretreatment process S19-1b is performed at an upper portion of the tank, and the treatment process S19-2b is performed at a lower portion of the tank. Accordingly, in the oxidizing agent treatment device 19b, the space of one pretreatment tank (or one treatment tank) and the space for the pipe 135 which connects the pretreatment tank and the treatment tank are not necessary, and the oxidizing agent treatment device 19b can be regarded as a device which saves space.

According to the present embodiment, the pretreatment process S19-1b and the treatment process S19-2b can be performed in the same tank, and the mixed matter 98 which has been performed with the pretreatment process S19-1b need not be transferred to another tank so as to perform the treatment process S19-2b, whereby the treatment efficiency can be improved.

EXAMPLES

Hereinbelow, the examples and comparative examples with regard to the pretreatment process S19-1b and/or the treatment process S19-2b in the oxidizing agent treatment process S19 of the first embodiment are explained.

Example 1

In the oxidizing agent treatment process S19, the pretreatment process S19-1b was not performed, and only the treatment process S19-2b was performed. In the treatment process S19-2b, the aqueous solution which included the mixed matter 98 was supplied to the treatment tank 105. The viscosity, that is, the solid viscosity of the mixed matter 98 was 31.5 mPa·s, and the concentration, that is, the solid concentration of the mixed matter 98 within the treatment solution P2 was 0.7%. The solid viscosity after being performed with the treatment process S19-2b (the ozone concentration: 200 g/m³, the ozone supply amount: 100 g/h) for 20 minutes was 22.0 mPa·s.

Examples 2 to 6

In the oxidizing agent treatment process S19, after having had performed the pretreatment process S19-1b, the treatment process S19-2b was performed. In the pretreatment process S19-1b, the aqueous solution which included the mixed matter 98 was supplied to the pretreatment tank 101. The viscosity, that is, the solid viscosity of the mixed matter 98 was 78.6 mPa·s in average, and the concentration, that is, the solid concentration of the mixed matter 98 within the pretreatment solution P1 was 1%. The solid viscosity after being performed with the pretreatment process S19-1b (the ozone concentration: 200 g/m³, the ozone supply amount: 100 g/h) for 10 minutes was 31.2 mPa·s in average. Subsequently, in the treatment process S19-2b, the pretreatment solution P1 which included the mixed matter 98 was supplied to the treatment tank 105. The concentration, that is, the solid concentration of the mixed matter 98 within the treatment solution P2 was less than 1%. The solid viscosity after being performed with the treatment process S19-2b (the ozone concentration: 200 g/m³, the ozone supply amount: 100 g/h) for 20 minutes was 21.7 mPa·s in average.

Example 7

The treatment content was the same as those of examples 2 to 6, except that in the pretreatment process S19-1b, the viscosity, that is, the solid viscosity of the mixed matter 98 was 385 mPa·s, and the concentration, that is, the solid concentration of the mixed matter 98 within the pretreatment solution P1 was 2%. The solid viscosity after being performed with the pretreatment process S19-1b for 10 minutes was 42.0 mPa·s. The solid viscosity after being performed with the treatment process S19-2b for 20 minutes was 23.0 mPa·s.

Comparative Example 1

In the oxidizing agent treatment process S19, only the pretreatment process S19-1b was performed, and the treatment process S19-2b was not performed. In the pretreatment process S19-1b, the aqueous solution which included the mixed matter 98 was supplied to the pretreatment tank 101. The viscosity, that is, the solid viscosity of the mixed matter 98 was 31.5 mPa·s, and the concentration, that is, the solid concentration of the mixed matter 98 within the pretreatment solution P1 was 0.7%. The solid viscosity after being performed with the pretreatment process S19-1b (the ozone concentration: 200 g/m³, the ozone supply amount: 100 g/h) for 40 minutes was 22.0 mPa·s.

Comparative Example 2

The treatment content was the same as that of comparative example 1, except that the viscosity, that is, the solid viscosity of the mixed matter 98 was 80.0 mPa·s, and the concentration, that is, the solid concentration of the mixed matter 98 within the pretreatment solution P1 was 1%. The solid viscosity after being performed with the pretreatment process S19-1b for 40 minutes was 21.0 mPa·s.

Comparative Example 3

The treatment content was the same as that of example 1, except that the viscosity, that is, the solid viscosity of the mixed matter 98 was 79.0 mPa·s, and the concentration, that is, the solid concentration of the mixed matter 98 within the treatment solution P2 was 1%. In this case, the solid viscosity was too high that the pulp fibers which include the superabsorbent polymers could not pass through inside the ejector 107. Accordingly, the oxidizing agent treatment could not substantially be performed.

It should be noted that the measurement of the viscosity was performed by the following method. 100 ml of the sample solution is placed into a 200 ml beaker, and was measured by a viscometer TVB-10M (manufactured by Toki Sangyo Co., Ltd). Note that the viscosity before the oxidizing agent treatment was measured by the TM2 rotor of the viscometer, and the viscosity other than the same was measured by the TM1 rotor. The measurement time was 30 seconds, and the number of rotations of each rotor at the time of measurement was 60 rpm.

In each of the above-mentioned examples, etc., it was judged that the superabsorbent polymers were sufficiently removed when the viscosity, that is, the solid viscosity of the mixed matter 98 which was finally obtained by the oxidizing agent treatment was 25 mPa·s or less (for example, within the range of 19 to 25 mPa·s). Further, in each of the above-mentioned examples, etc., it was judged that the treatment was efficiently performed when the total treatment time of the oxidizing agent treatment was 35 minutes or less. As a result, in the examples 1 to 7, the solid viscosity was 25 mPa·s or less, and the total treatment time was 30 minutes or less, whereby the examples 1 to 7 were judged that the treatment had been efficiently performed. In the comparative examples 1 and 2, although the solid viscosity was 25 mPa·s or less, the total treatment time was over 35 minutes, whereby the comparative examples 1 and 2 were judged that the treatment had not been efficiently performed. In the comparative example 3, the oxidizing agent treatment could not be performed. From the above-mentioned results, it was confirmed that the superabsorbent polymers could be removed efficiently in a short amount of time by the treatment which used the ejector. The above-mentioned results are shown in the following Table 1.

TABLE 1

| Sample | Solid concentration (%) | Viscosity before oxidizing agent treatment (mPa · s) | Viscosity after pre-treatment process (mPa · s) | Pre-treatment process time (minutes) | Viscosity after treatment process (mPa · s) | Treatment process time (minutes) | Total treatment time (minutes) | Judgement |
|---|---|---|---|---|---|---|---|---|
| E* 1 | 0.7 | 31.5 | — | — | 22 | 20 | 20 | Good |
| E 2 | 1 | 80.0 | 30.7 | 10 | 23.2 | 20 | 30 | Good |
| E 3 | 1 | 78.5 | 31.1 | 10 | 21.4 | 20 | 30 | Good |
| E 4 | 1 | 77.8 | 31.5 | 10 | 20.4 | 20 | 30 | Good |
| E 5 | 1 | 77.5 | 32.1 | 10 | 21.0 | 20 | 30 | Good |
| E 6 | 1 | 79.1 | 30.4 | 10 | 22.4 | 20 | 30 | Good |
| A v* | — | 78.6 | 31.2 | 10 | 21.7 | 20 | 30 | Good |
| E 7 | 2 | 385 | 42.0 | 10 | 23.0 | 20 | 30 | Good |
| C e* 1 | 0.7 | 31.5 | 22.0 | 40 | — | — | 40 | Not good |
| C e 2 | 1 | 80.0 | 21.0 | 40 | — | — | 40 | Not good |
| C e 3 | 1 | 79.0 | — | — | Not available | Not available | Not available | Not good |

*E: Example,
*C e: Comparative example,
*A v: Average value

The above-mentioned embodiment explains a case in which the configurational member of the back sheet is a film, and the configurational member of the top sheet is a nonwoven fabric. However, an embodiment in a case in which the configurational member of the back sheet is a nonwoven fabric, and the configurational member of the top sheet is a film, or a case in which both of the configurational members of both of the back sheet and the top sheet are films, can also be realized by the similar method as the above-mentioned embodiment, and can exhibit the similar effect.

The absorbent article of the present invention is not limited to the above-described each of the embodiments, and combination or variation, etc., is possible as appropriate, without departing from the scope of the object and the subject matter of the present invention.

REFERENCE SIGNS LIST

19-2a supply process
19-2b treatment process
98 mixed matter
105 treatment tank
107 ejector
AI suction fluid supply port
CO mixed fluid discharge port
DI drive fluid supply port
P2 treatment solution
Z2 gaseous substance

The invention claimed is:

1. A method of manufacturing recycled pulp fibers from mixed matter of pulp fibers and superabsorbent polymers which is separated from a used absorbent article, the method comprising:

a supply process of supplying a gaseous substance which decomposes the superabsorbent polymers so as to be able to dissolve to a suction fluid supply port of an ejector, while supplying an aqueous solution which includes the mixed matter to a drive fluid supply port of the ejector, wherein the ejector has a narrowed portion in the middle of a flow path between the drive fluid supply port and a mixed fluid discharge port, wherein pressure in the narrowed portion is reduced so that the suction fluid from the suction fluid supply port is drawn in to the narrowed portion so as to mix with the drive fluid to create a mixed solution; and a treatment process of reducing the superabsorbent polymers in the mixed matter by discharging the mixed solution from a mixed fluid discharge port of the ejector which is connected to a lower portion of a treatment tank, into a treatment solution within the treatment tank.

2. The method according to claim 1, wherein the supply process includes a process of extracting at least a portion of the treatment solution which includes the mixed matter from a lower portion of the treatment tank, so as to supply the extracted treatment solution to the drive fluid supply port as the aqueous solution.

3. The method according to claim 1, further comprising:
a pretreatment supply process of supplying the mixed matter into a pretreatment solution within a pretreatment tank before the supply process and the treatment process,
a pretreatment process of reducing the superabsorbent polymers of the mixed matter by, inside the pretreatment tank, emitting a gaseous substance for pretreatment which decomposes the superabsorbent polymers so as to be able to dissolve by a gaseous substance emission portion within the pretreatment tank, from below the mixed matter, toward the mixed matter which is present inside the pretreatment solution separate from a bottom portion of the pretreatment tank, and
a pretreatment solution transfer process of extracting at least a portion of the pretreatment solution which includes the mixed matter in which the superabsorbent polymers have been reduced in the pretreatment process, from a lower portion of the pretreatment tank, so as to transfer the extracted pretreatment solution through an upper portion of the treatment tank to the treatment solution.

4. The method according to claim 1, further comprising:
a pretreatment supply process of supplying the mixed matter into a pretreatment solution within a pretreatment tank, before the supply process and the treatment process,
a pretreatment process of reducing the superabsorbent polymers of the mixed matter by, inside the pretreatment tank, emitting a gaseous substance for pretreatment which decomposes the superabsorbent polymers so as to be able to dissolve by a gaseous substance emission portion within the pretreatment tank, from below the mixed matter, toward the mixed matter which is present inside the pretreatment solution separate from a bottom portion of the pretreatment tank, and
a pretreatment solution transfer process of extracting at least a portion of the pretreatment solution which includes the mixed matter in which the superabsorbent polymers have been reduced in the pretreatment process from a lower portion of the pretreatment tank, so as to transfer the extracted pretreatment solution to the drive fluid supply port.

5. The method according to claim 3, wherein
the pretreatment supply process includes a process of extracting at least a portion of the pretreatment solution which includes the mixed matter from a lower portion of the pretreatment tank, so as to supply the extracted pretreatment solution from an upper portion of the pretreatment tank into the pretreatment solution.

6. The method according to claim 1, wherein
the treatment tank includes a gaseous substance emission portion which is positioned at a higher portion of the treatment tank than the mixed fluid discharge port,
the method further comprising:
this is changed to read "a pretreatment supply process of supplying the mixed matter to an upper part of the treatment solution in the treatment tank before the supply process and the treatment process, and
a pretreatment process of reducing the superabsorbent polymers of the mixed matter in the treatment tank by emitting a gaseous substance for pretreatment which decomposes the superabsorbent polymers so as to be able to dissolve from the gaseous substance emission portion toward the mixed matter which is present at a higher portion of the treatment tank than the gaseous substance emission portion,
wherein at least a portion of the treatment solution which includes the mixed matter in which the superabsorbent polymers have been reduced by the pretreatment process is moved toward the treatment solution which is present at a lower portion of the treatment tank than the gaseous substance emission portion, and
the treatment process is performed at a lower portion of the treatment tank than the gaseous substance emission portion and an upper portion of the treatment tank than the gaseous substance emission portion.

7. The method according to claim 1, wherein
the gaseous substance includes ozone.

8. The method according to claim 1, further comprising:
an inactivation process of inactivating an absorption performance of the superabsorbent polymers in the mixed matter, by treating the mixed matter by using an aqueous solution which is capable of inactivating the absorption performance of the superabsorbent polymers, before reducing the superabsorbent polymers in the mixed matter.

* * * * *